US008237852B2

(12) United States Patent
Shibuno et al.

(10) Patent No.: US 8,237,852 B2
(45) Date of Patent: Aug. 7, 2012

(54) CAMERA BODY AND CAMERA SYSTEM

(75) Inventors: Koji Shibuno, Osaka (JP); Taizo Aoki, Hyogo (JP); Takao Watanabe, Kyoto (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 12/608,641

(22) Filed: Oct. 29, 2009

(65) Prior Publication Data
US 2010/0110277 A1 May 6, 2010

(30) Foreign Application Priority Data

Oct. 30, 2008 (JP) ................................. 2008-279433

(51) Int. Cl.
*H04N 5/225* (2006.01)
(52) U.S. Cl. ................... 348/360; 348/335; 348/333.01; 348/333.12; 396/529
(58) Field of Classification Search .......... None
See application file for complete search history.

(56) References Cited

U.S. PATENT DOCUMENTS

2006/0098114 A1* 5/2006 Horii ............................. 348/360
2007/0153112 A1* 7/2007 Ueda et al. .................... 348/335
2008/0088727 A1* 4/2008 Nagata et al. ............. 348/333.01
2008/0240709 A1* 10/2008 Nakamura .................... 396/529
2011/0164154 A1* 7/2011 Honjo et al. .................. 348/241

FOREIGN PATENT DOCUMENTS

JP 2-123879 A 5/1990
JP 2000-184247 A 6/2000

* cited by examiner

Primary Examiner — David Ometz
Assistant Examiner — Dwight C Tejano
(74) Attorney, Agent, or Firm — Panasonic Patent Center; Dhiren Odedra; Kerry Culpepper

(57) ABSTRACT

A camera body includes an imaging unit operable to generate image data by capturing an object image, an acquisition unit operable to acquire optical data of the interchangeable lens from the interchangeable lens, a correction unit operable to correct the image data generated by the imaging unit based on the optical data acquired by the acquisition unit, a detection unit operable to detect state of mounting/demounting the interchangeable lens to/from the camera body, and a display unit operable to display an image based on the image data. After detecting that the interchangeable lens is completely mounted to the camera body, when the detection unit detects that the interchangeable lens is being demounted from the camera body, the display unit stops displaying the image based on the image data. When the detection unit subsequently detects that the interchangeable lens is completely demounted from the camera body, the correction unit stops correcting the image data and the display unit displays the image based on the image data.

18 Claims, 18 Drawing Sheets

Fig. 10

| FENC \ ZENC | 0 | 1 | 2 | 3 | ... | Nz |
|---|---|---|---|---|---|---|
| 0 | C3(0,0) C5(0,0) C7(0,0) T(0,0) | C3(1,0) C5(1,0) C7(1,0) T(1,0) | C3(2,0) C5(2,0) C7(2,0) T(2,0) | C3(3,0) C5(3,0) C7(3,0) T(3,0) | ... | C3(Nz,0) C5(Nz,0) C7(Nz,0) T(Nz,0) |
| 1 | C3(0,1) C5(0,1) C7(0,1) T(0,1) | C3(1,1) C5(1,1) C7(1,1) T(1,1) | C3(2,1) C5(2,1) C7(2,1) T(2,1) | C3(3,1) C5(3,1) C7(3,1) T(3,1) | ... | C3(Nz,1) C5(Nz,1) C7(Nz,1) T(Nz,1) ← E |
| 2 | C3(0,2) C5(0,2) C7(0,2) T(0,2) | C3(1,2) C5(1,2) C7(1,2) T(1,2) | C3(2,2) C5(2,2) C7(2,2) T(2,2) | C3(3,2) C5(3,2) C7(3,2) T(3,2) | ... | C3(Nz,2) C5(Nz,2) C7(Nz,2) T(Nz,2) |
| 3 | C3(0,3) C5(0,3) C7(0,3) T(0,3) | C3(1,3) C5(1,3) C7(1,3) T(1,3) | C3(2,3) C5(2,3) C7(2,3) T(2,3) | C3(3,3) C5(3,3) C7(3,3) T(3,3) | ... | C3(Nz,3) C5(Nz,3) C7(Nz,3) T(Nz,3) |
| ⋮ | ⋮ | ⋮ | ⋮ | ⋮ | | ⋮ |
| Nf | C3(0,Nf) C5(0,Nf) C7(0,Nf) T(0,Nf) | C3(1,Nf) C5(1,Nf) C7(1,Nf) T(1,Nf) | C3(2,Nf) C5(2,Nf) C7(2,Nf) T(2,Nf) | C3(3,Nf) C5(3,Nf) C7(3,Nf) T(3,Nf) | ... | C3(Nz,Nf) C5(Nz,Nf) C7(Nz,Nf) T(Nz,Nf) |

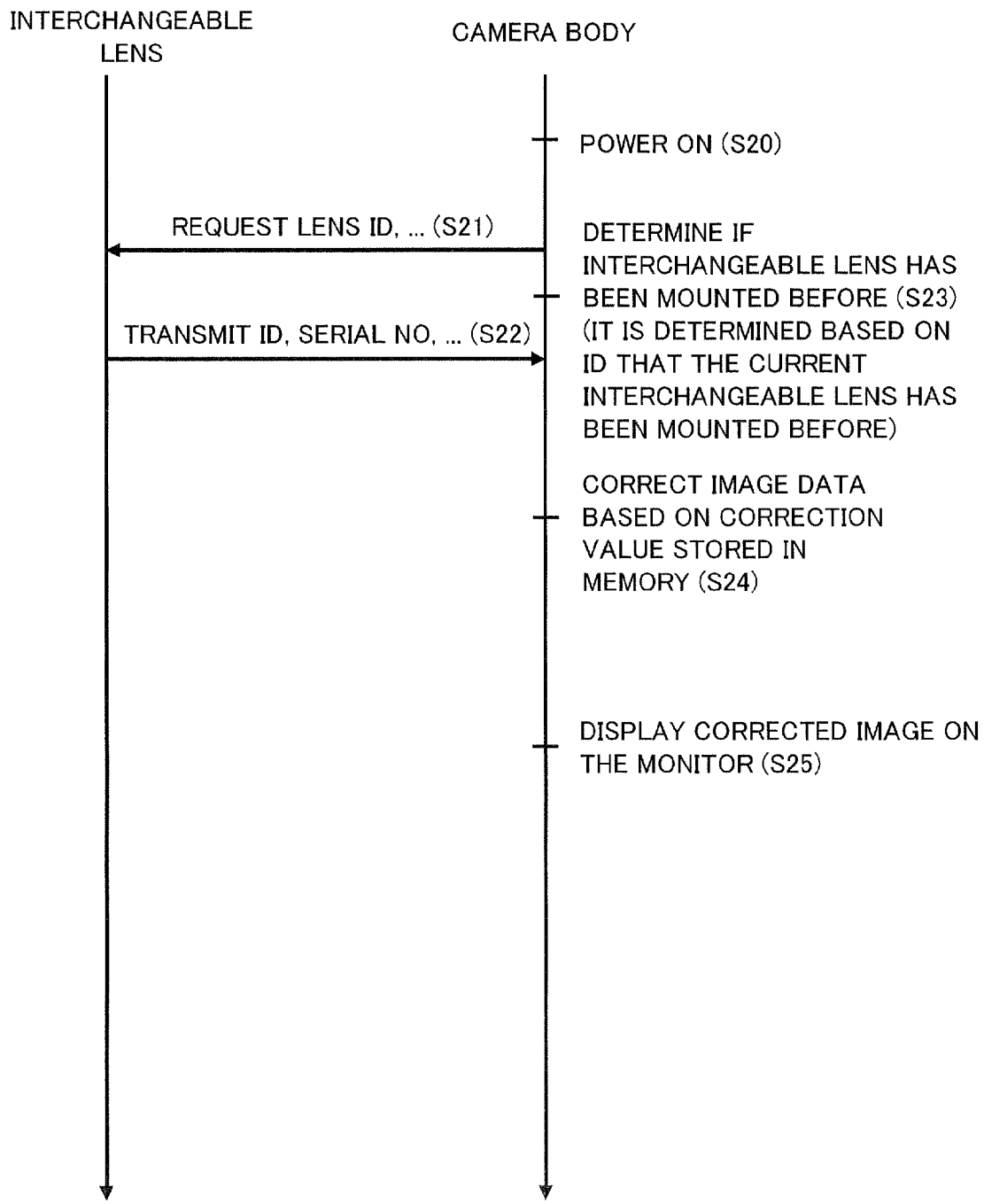

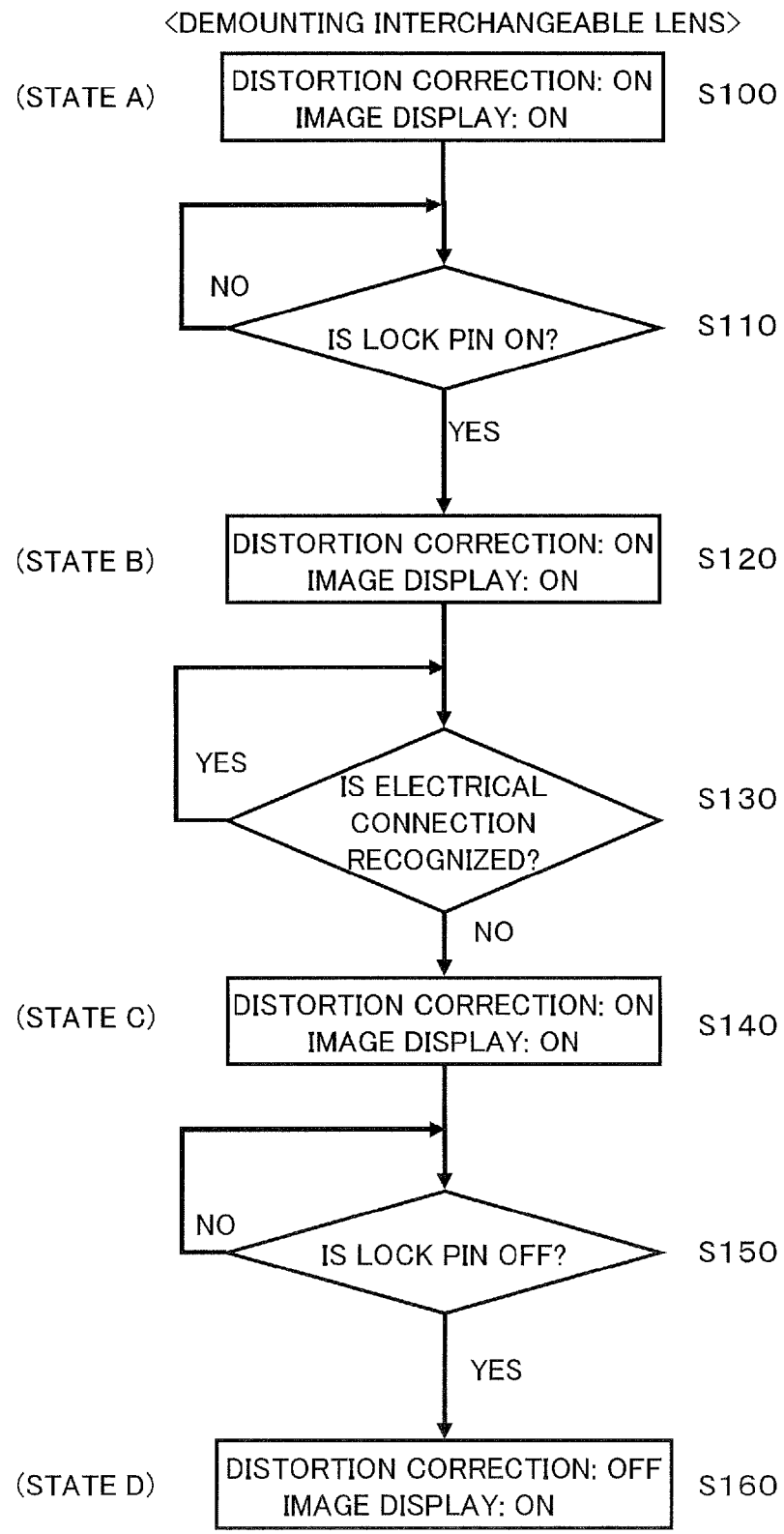

STATE OF LENS BEING MOUNTED/DEMOUNTED (STATE C)

CONNECTION CHECK TERMINAL: OFF
LOCK PIN: ON

STATE OF LENS COMPLETELY DEMOUNTED (STATE D)

CONNECTION CHECK TERMINAL: OFF
LOCK PIN: OFF

CAMERA BODY AND CAMERA SYSTEM

BACKGROUND

1. Technical Field

The technical field relates to a camera system, and in particular, to a camera system capable of correcting captured image data.

2. Related Art

JP-2000-184247A discloses a system including a digital camera of lens interchangeable type and an image processing unit. A camera body of the digital camera of lens interchangeable type obtains an ID (lens ID) of an interchangeable lens mounted on the camera body. The digital camera of lens interchangeable type, when capturing image data, stores the captured image data and the lens ID in a storage medium.

The image processing unit can correct distortion and shading of the image data stored in the storage medium. For this purpose, the image processing unit has correction data for correction of distortion and shading for each of interchangeable lenses.

The image data captured by the digital camera of lens interchangeable type is stored in the storage medium together with the lens ID of the interchangeable lens mounted thereto. Therefore, the image processing unit referring to the lens ID stored in the storage medium can determine what kind of lens was mounted on the camera body at the time of generation of the image data stored in the storage medium. As a result, the image processing unit can appropriately correct the image data stored in the storage medium taking the lens characteristic into consideration.

As described above, in the system including the digital camera of lens interchangeable type and the image processing unit, the captured image data can be appropriately corrected simply by storing, in the storage medium, minimum information including the captured image data and the lens ID of the mounted lens, at the time of capturing the image data with the digital camera of lens interchangeable type.

In JP-2000-184247A as described above, however, the image data is corrected not by a digital camera of lens interchangeable type but by an image processing unit. Therefore, there are not disclosed techniques for improving operating conveniences to correct the image data in the digital camera during the process executed by the digital camera, such as a technique of increasing the speed of correcting the image data, a technique to cope with the situation in which a lens exceeding the correction limit is mounted, and a technique for displaying the corrected image data on a LCD monitor.

SUMMARY

To solve the aforementioned problems, a camera system is provided, which is capable of correcting image data and particularly provides improved convenience for a user in displaying the corrected image data on an LCD monitor.

In a first aspect, a camera body to which an interchangeable lens is mountable is provided. The camera includes an imaging unit operable to generate image data by capturing an object image; an acquisition unit operable to acquire optical data indicating an optical characteristic of the interchangeable lens from the interchangeable lens; a correction unit operable to correct the image data generated by the imaging unit based on the optical data acquired by the acquisition unit; a detection unit operable to detect a state of mounting/demounting the interchangeable lens to/from the camera body; and a display unit operable to display an image based on the image data. After detecting that the interchangeable lens is completely mounted to the camera body, when the detection unit detects that the interchangeable lens is being demounted from the camera body, the display unit stops displaying the image based on the image data. When the detection unit subsequently detects that the interchangeable lens is completely demounted from the camera body, the correction unit stops correcting the image data and the display unit displays the image based on the image data. With this arrangement, it is possible to prevent display of poor quality image which is not corrected while demounting the lens from the camera body.

In a second aspect, a camera body to which an interchangeable lens is mountable is provided. The camera body includes an imaging unit operable to generate image data by capturing an object image; an acquisition unit operable to acquire optical data indicating an optical characteristic of the interchangeable lens from the interchangeable lens; a correction unit operable to correct the image data generated by the imaging unit based on the optical data acquired by the acquisition unit; a detection unit operable to detect a state of mounting/demounting the interchangeable lens to/from the camera body; and a display unit operable to display an image based on the image data. When the detection unit detects that the interchangeable lens is completely demounted from the camera body, the display unit displays the image based on the image data. When the detection unit subsequently detects that the interchangeable lens is being mounted to the camera body, the display unit stops displaying the image based on the image data. With this arrangement, it is possible to prevent display of image on the display unit while mounting the lens to the camera body, thus preventing a poor quality image which is not corrected from being displayed even when image correction is not conducted during the mounting of the lens.

In a third aspect, a camera body to which an interchangeable lens is mountable is provided. The camera body includes: an imaging unit operable to generate image data by capturing an object image; an acquisition unit operable to acquire optical data indicating an optical characteristic of the interchangeable lens from the interchangeable lens; a correction unit operable to correct the image data generated by the imaging unit based on the optical data acquired by the acquisition unit; a detection unit operable to detect a state of mounting/demounting the interchangeable lens to/from the camera body; and a display unit operable to display an image based on the image data. After detecting that the interchangeable lens is completely mounted to the camera body, when the detection unit detects that the interchangeable lens is being demounted from the camera body, the display unit displays the image based on the image data. When the detection unit subsequently detects that the interchangeable lens is completely demounted from the camera body, the correction unit stops correcting the image data and the display unit displays the image based on the image data.

In a fourth aspect, a camera body to which an interchangeable lens is mountable is provided. The camera body includes: an imaging unit operable to generate image data by capturing an object image; an acquisition unit operable to acquire optical data indicating an optical characteristic of the interchangeable lens from the interchangeable lens; a correction unit operable to correct the image data generated by the imaging unit based on the optical data acquired by the acquisition unit; a detection unit operable to detect state of mounting/demounting the interchangeable lens to/from the camera body; and a display unit operable to display an image based on the image data. When the detection unit detects that the interchangeable lens is completely mounted to the camera body, the correction unit corrects the image data and the display unit displays the image based on the image data. When the detection unit subsequently detects that the interchangeable lens is completely demounted from the camera body, the correction unit stops correcting the image data and the display unit displays the image based on the image data.

In a fifth aspect, a camera system including an interchangeable lens including a storage unit storing the optical data indicating the optical characteristic of the interchangeable lens; and the camera body of each of the aforementioned aspects.

According to the above aspects, the display unit is controlled to prevent display of the image which is not corrected during mounting/demounting of the interchangeable lens. As a result, a user is prevented from viewing distorted image before correction, thereby resulting in an improved convenience to a user.

BRIEF DESCRIPTION OF DRAWINGS

FIG. 10 is a diagram showing an example of a correction coefficient table.
FIG. 13 is a diagram for explaining an initializing operation (second and subsequent operations).
FIG. 14 is a flowchart for explaining the distortion correction process and the image display process (first example processing) in demounting an interchangeable lens.

DETAIL DESCRIPTION OF PREFERRED EMBODIMENT

A preferred embodiment is explained below with reference to the drawings.

1. First Embodiment 1-1 Configuration

Figure 1:
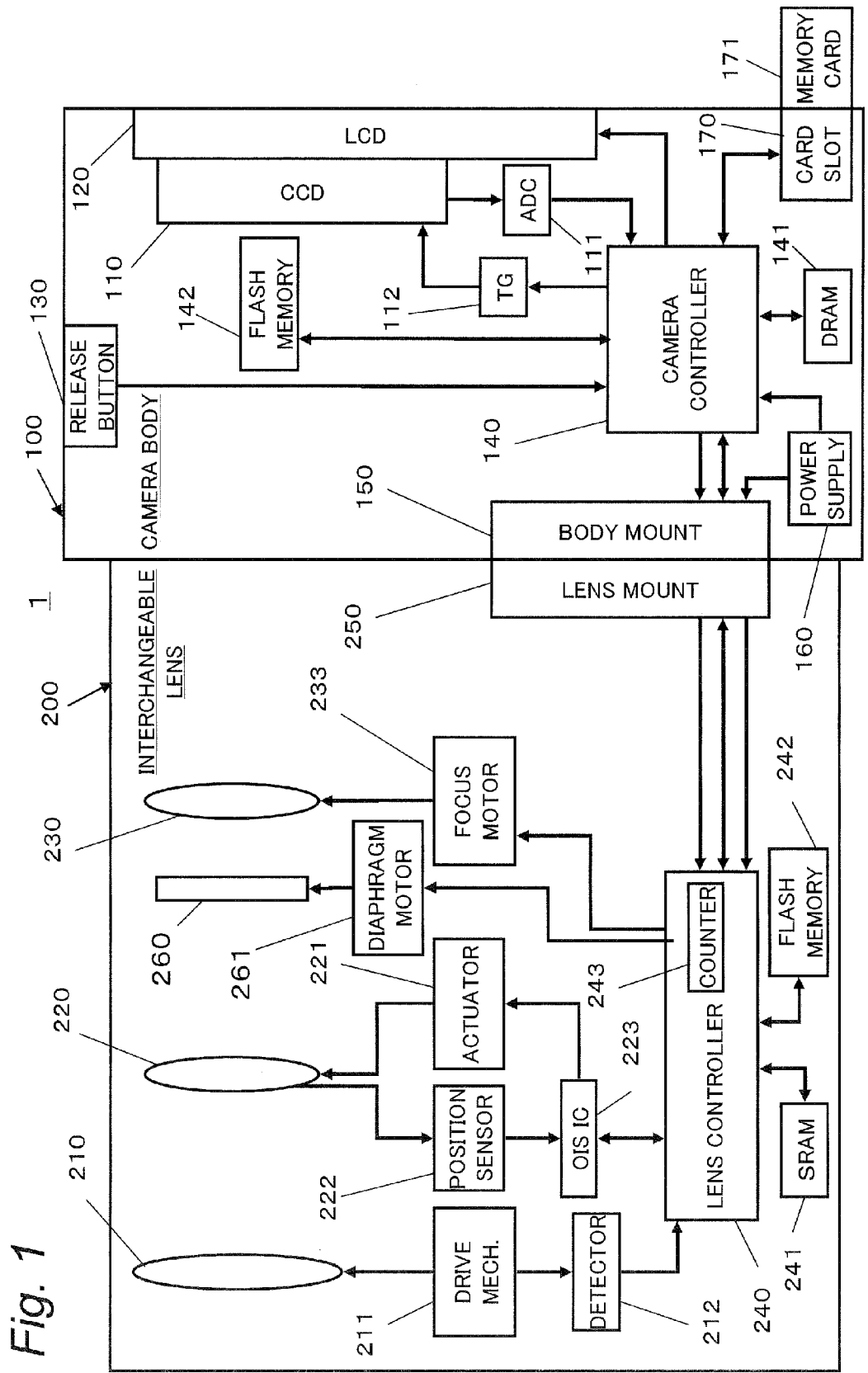
FIG. 1 is a diagram showing a configuration of a camera system according to a first embodiment.

FIG. 1 shows a configuration of the camera system according to this embodiment. The camera system 1 is configured of a camera body 100 and an interchangeable lens 200. The camera body 100 can correct distortion or the like of image data captured by a CCD image sensor 110.

1-1-1 Configuration of Camera Body

The camera body 100 includes a CCD image sensor 110, a liquid crystal display (LCD) monitor 120, a camera controller 140, a body mount 150, a power supply 160 and a card slot 170.

The camera controller 140, controls operations of the respective parts including the CCD image sensor 110 to control the operation of the entire camera system 1 in response to a command from an operational member such as a release button 130. The camera controller 140 sends a vertical synchronizing signal to a timing generator 112. A DRAM 141 is used as a work memory for control and image processing operations performed by the camera controller 140. A flash memory 142 stores programs and parameters used for the control operation of the camera controller 140. Also, the flash memory 142 stores information such as a gain G and a gain TMG to correct distortion for each of interchangeable lenses mounted on the camera body 100. The details of gain G and the gain TMG for distortion correction are described later. The flash memory 142 stores the information on the gain G and the gain TMG with the gain G and the gain TMG associated with an ID or a serial number of the interchangeable lens.

The CCD image sensor 110 generates an image signal from an optical signal containing an object image incident through the interchangeable lens 200. The generated image signal is converted into a digital signal, i.e. image data by an A/D converter 111. The image data generated by the A/D converter 111 is subjected to various image processing by the camera controller 140. The various image processing includes, for example, a gamma correction process, a white balance correction process, a defect correction process, a YC conversion process, an electronic zoom process, an image compression process such as a JPEG compression process, a distortion correction process and a chromatic aberration correction process. In this way, the camera system 1 according to this embodiment has the function to correct distortion. The details of the distortion correction function will be described later.

The CCD image sensor 110 operates at a timing controlled by the timing generator 112. The operations of the CCD image sensor 110 include an operation of capturing a still image, an operation of capturing a moving image, and an operation of capturing a through image. The through image is displayed on the LCD monitor 120 in real time after being captured by the CCD image sensor, but is not recorded in a memory card 171. The through image is mainly a moving image, and is displayed on the LCD monitor 120 to allow a user to determine a composition at the time of capturing a still image. This function of displaying a through image constituting a moving image (successive images) in real time on the LCD monitor 120 is called the live view function.

The LCD monitor 120 displays an image indicated by a display image data processed by the camera controller 140. The LCD monitor 120 can selectively display a moving image and a still image.

The card slot 170 can be loaded with the memory card 171 and writes/reads data to/from the memory card 171 under the control of the camera controller 140. The memory card 171 can store image data generated by the image processing operation of the camera controller 140. For example, the memory card 171 can store a JPEG image file. Also, the image data or the image file stored in the memory card 171 can be read from the memory card 171. The image data or the image file read from the memory card 171 is subjected to the image processing by the camera controller 140. For example, the camera controller 140 decompresses the image data or the image file obtained from the memory card 171 to generate display image data.

The power supply 160 supplies electric power to be consumed by the camera system 1. The power supply 160 may be, for example, a dry cell or a rechargeable battery. Alternatively, the power supplied from an external source may be supplied to the camera system 1 through a power cord.

The body mount 150 can be connected mechanically and electrically to a lens mount 250 of the interchangeable lens 200. The body mount 150 can transmit and receive commands and data to and from the interchangeable lens 200 through the lens mount 250. The body mount 150 transmits various control signals received from the camera controller 140 to the lens controller 240 through the lens mount 250. The body mount 150 supplies the power from the power supply 160 to the entire interchangeable lens 200 through the lens mount 250.

1-1-2 Configuration of Interchangeable Lens

The interchangeable lens 200 includes an optical system, the lens controller 240, and the lens mount 250. The optical system includes a zoom lens 210, an OIS lens 220, a diaphragm 260 and a focus lens 230.

The zoom lens 210 is a lens for changing the magnification of an object image formed by the optical system of the interchangeable lens 200. The zoom lens 210 is configured of one or plural pieces of lenses. A drive mechanism 211 includes a zoom ring and the like operable by a user, and moves the zoom lens 210 along an optical axis of the optical system in accordance with a rotating operation by a user. A detector 212 detects a drive amount of the drive mechanism 211. The lens controller 240 can grasp the zoom magnification in the optical system by obtaining a detection result of the detector 212.

The OIS lens 220 is a lens for correcting blur of the object image formed by the optical system of the interchangeable lens 200. The OIS lens 220 moves in such a direction as to cancel the blur of the camera system 1 to reduce the blur of the object image on the CCD image sensor 110. The OIS lens 220 is configured of one or plural pieces of lenses. An actuator 221 drives the OIS lens 220 in a plane perpendicular to the optical axis of the optical system under the control of an OIS IC 223. The actuator 221 can be realized by, for example, a magnet and a flat coil. A position detection sensor 222 detects the position of the OIS lens 220 in the plane perpendicular to the optical axis of the optical system. The position detection sensor 222 can be realized by, for example, a magnet and a Hall element. The OIS IC 223 obtains a detection result of a camera shake sensor (not shown) such as a gyrosensor from the lens controller 240. The OIS IC 223 controls the actuator 221 based on the detection results of the position detection sensor 222 and the camera shake sensor. Also, the OIS IC 223 transmits a signal indicating the state of an optical image blur correction process to the lens controller 240.

The diaphragm 260 is a member for regulating the amount of light passing through the optical system. The diaphragm 260 includes plural blades or the like, and by opening/closing an opening formed of the blades, can regulate the light amount. A diaphragm motor 261 is a drive unit for opening/closing the opening of the diaphragm 260.

The focus lens 230 changes a focus state of the object image formed on the CCD image sensor 110 in the optical system. The focus lens 230 is configured of one or plural lenses.

A focus motor 233 drives the focus lens 230 under the control of the lens controller 240 to go forward or backward the focus lens 230 along the optical axis of the optical system so that the focus state of the object image formed on the CCD image sensor 110 in the optical system can be changed. According to the first embodiment, the focus motor 233 is a stepping motor. Nevertheless, the focus motor 233 is not limited to such a motor but may be, for example, a servo motor or an ultrasonic motor.

The lens controller 240 controls operations of the OIS IC 223 and the focus motor 233 based on the control signal from the camera controller 140 to control the overall operation of the interchangeable lens 200. The lens controller 240 also receives a signal from the detector 212 and the OIS IC 223 and transmits the signal to the camera controller 140. The lens controller 240 transmits and receives a signal to and from the camera controller 140 through the lens mount 250 and body mount 150.

The lens controller 240 uses a SRAM 241 as a work memory on performing the control operation. A flash memory 242 stores programs and parameters used for the control operation of the lens controller 240, such as, distortion correction information which is described later.

The lens mount 250 is adapted to be mechanically and electrically connected with the body mount 150 of the camera body 100. The lens mount 250 can transmit and receive commands and data to and from the camera body 100 through the body mount 150. The lens mount 250 transmits the received several signals received from the lens controller 240 to the camera controller 140 through the body mount 150. For example, the lens mount 250 transmits the distortion correction information received from the lens controller 240 to the camera controller 140 through the body mount 150.

1-2 Correspondence of Technical Terms

The interchangeable lens 200 is just an example of an interchangeable lens. The camera body 100 is only an example of a camera body. The CCD image sensor 110 is an example of an imaging unit. The body mount 150 is an example of an acquisition unit. The camera controller 140 is an example of a correction unit. The LCD monitor 120 is an example of a display unit. The flash memory 242 is an example of a storage unit. A connection check terminal 11 and a lock pin 15 are examples of detection unit.

1-3 Distortion Correction

The camera system 1 according to this embodiment has a function of electrically correcting distortion. The correction of distortion is explained below.

1-3-1 Basic Concept of Distortion Correction

Figure 2:
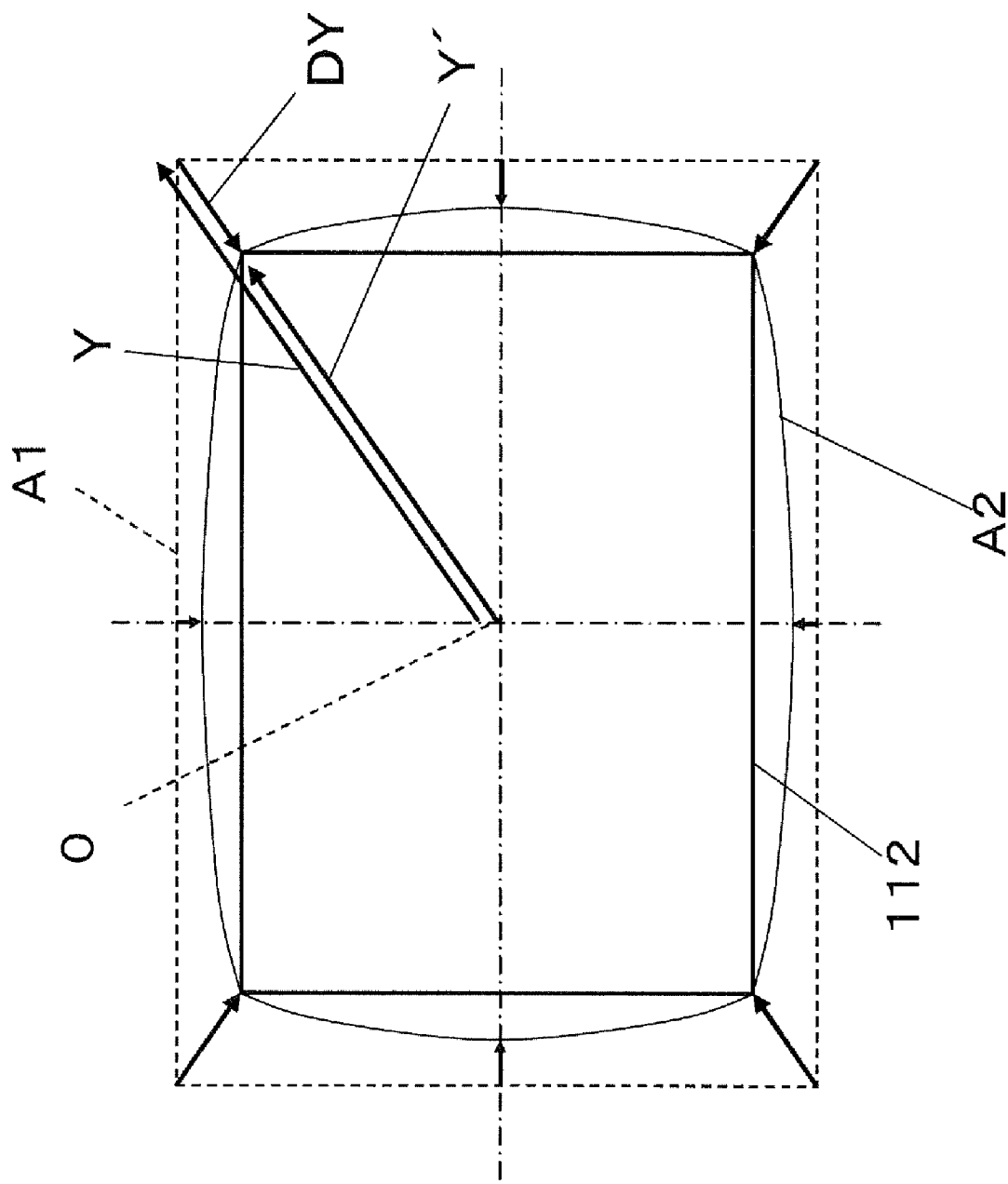
FIG. 2 is a diagram showing a barrel-type distortion.

The basic concept of the distortion correction is explained with reference to FIGS. 2 to 5. There are two types of distortion including a barrel type shown in FIG. 2 and a bobbin type shown in FIG. 3. The barrel-type distortion, as shown in FIG. 2, is such that four corners of a reference image A1 without distortion are directed inward to an optical center O to form a generally roundish image A2 on the CCD image sensor 110. The optical center O is the center of the CCD image sensor 110 and substantially coincides with the optical axis of an optical system 201.

Figure 3:
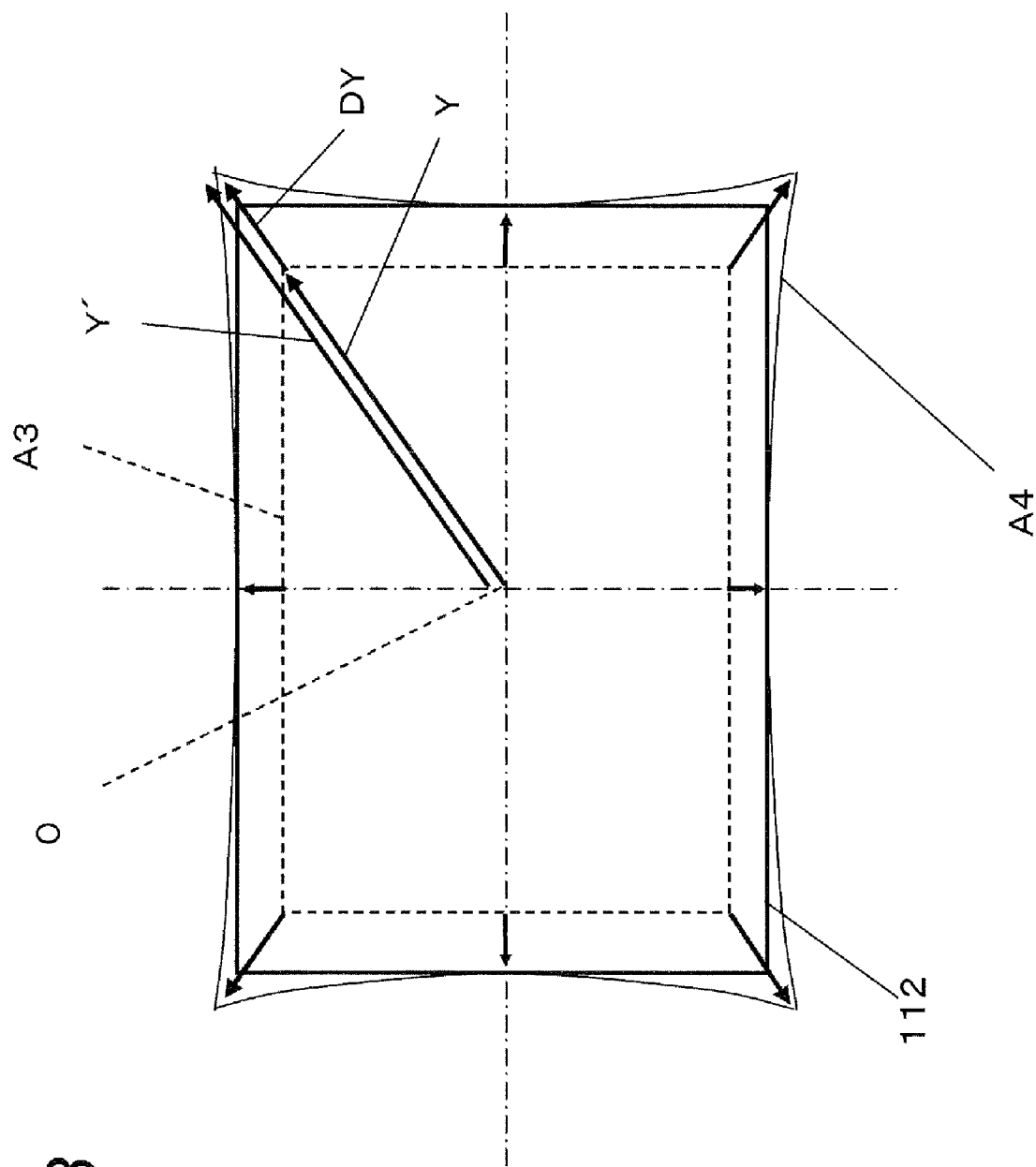
FIG. 3 is a diagram showing a bobbin-type distortion.

In the bobbin-type distortion, on the other hand, as shown in FIG. 3, the four corners of a reference image A3 without distortion are distorted outward expansively from the optical center O, so that an image A4 with four sharp corners is formed on the CCD image sensor 110.

As described above, with the occurrence of distortion, the outer peripheral portion of the object image captured by the CCD image sensor 110 is distorted.

Now, It is assumed that DY is a distortion amount, Y is a height of a real image distorted (the distance from the optical center O in the images A2 and A4) and Y' is a height of an ideal image not distorted (the distance from the optical center O in the images A1 and A3). Then, the distortion amount DY is expressed by the following Equation (1).

$$DY = Y - Y' \quad (1)$$

According to this embodiment, the distortion amount DY is defined by the following Equation (2).

$$DY = C3 \times Y^3 + C5 \times Y^5 + C7 \times Y^7 \quad (2)$$

The optimum values of correction coefficients C3, C5, and C7 are varied depending on the specification of the optical system implemented on the interchangeable lens. Specifically, these correction coefficients C3, C5, and C7 are numerical values specific to the interchangeable lens 200. Distortion is corrected using these correction coefficients. Equation (2) represents an example of the equation used to correct distortion, and other equations may alternatively be used. When using other equations, the type of the correction coefficient may be different from that of Equation (2).

In order to correct the distortion, the real image height Y is required to be converted to the ideal image height Y'. For converting the real image height Y to the ideal image height Y', the gain G is defined by the following Equation (3).

$$G = \frac{Y'}{Y} = 1 - \frac{DY}{Y} = 1 - C3 \times Y^2 - C5 \times Y^4 - C7 \times Y^6 \quad (3)$$

Figure 4:
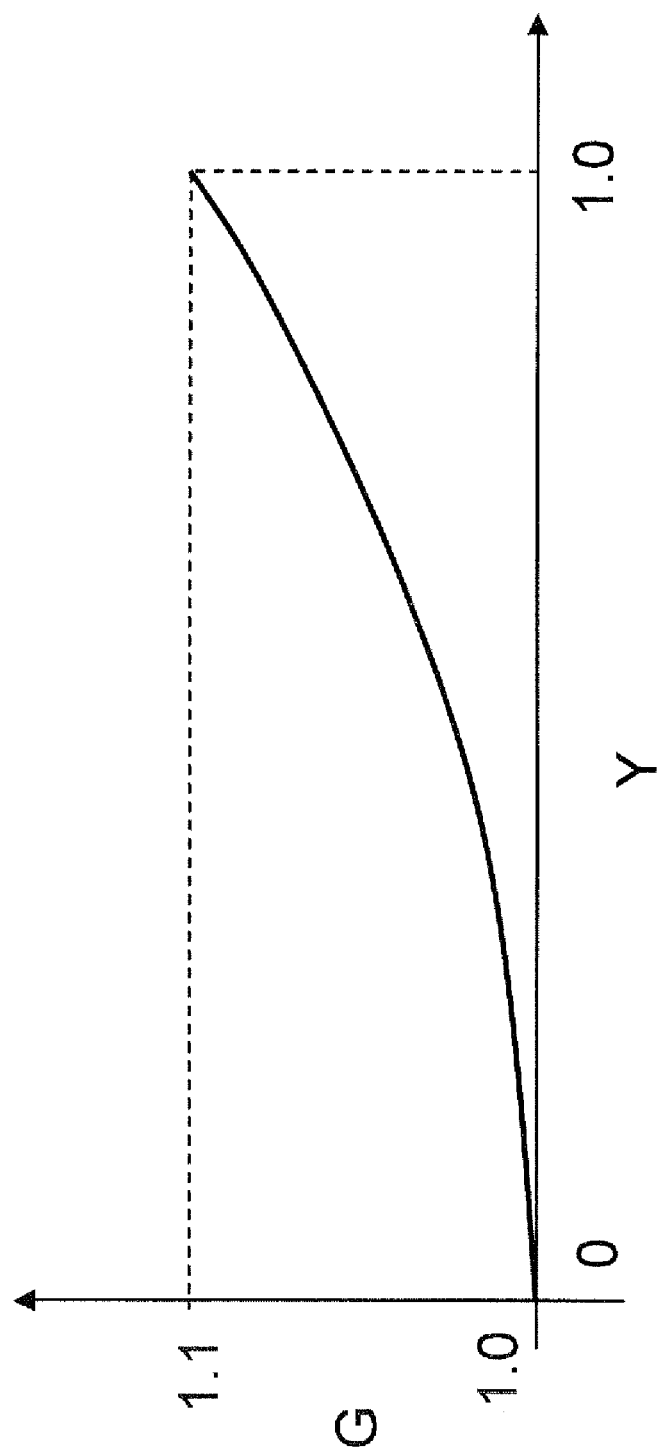
FIG. 4 is a diagram showing a gain G for correcting the barrel-type distortion.
Figure 5:
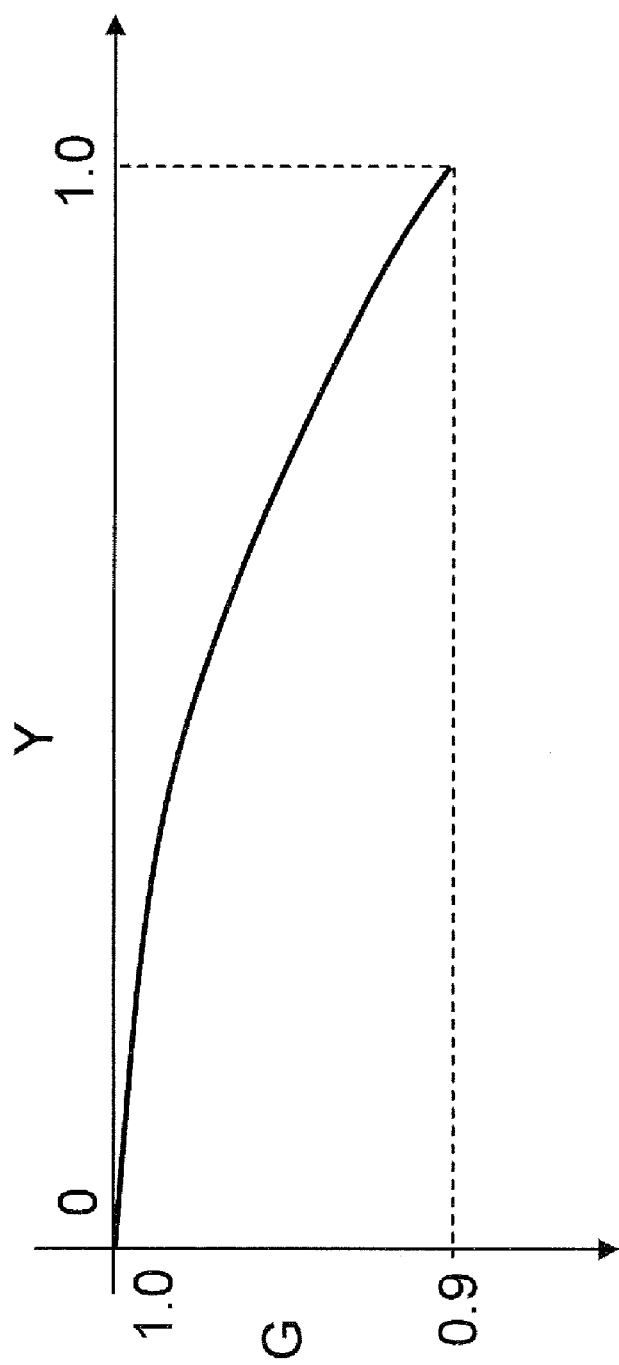
FIG. 5 is a diagram showing a gain G for correcting the bobbin-type distortion.

The gain G in Equation (3) indicates the gain function for converting the real image height Y to the ideal image height Y'. Assuming that the maximum value of the real image height Y is 1, the profile of the gain can be expressed as shown in FIGS. 4 and 5. In FIGS. 4 and 5, the ordinate represents the gain G, and the abscissa represents the real image height Y.

Referring to the gain profile as shown in FIGS. 4 and 5, the absolute value of the gain G gradually increases with the increase in the real image height Y (i.e. with the increase in the distance from the optical center O). This indicates that the distortion amount on the outer periphery of the image is larger than that at the center thereof.

In the case where the gain G is larger than 1 as shown in FIG. 4, the image is enlarged outward when the real image height Y is converted to the ideal image height Y'. In other words, the gain profile shown in FIG. 4 indicates that the distortion is the barrel type as shown in FIG. 2.

On the other hand, when the gain G is smaller than 1 as shown in FIG. 5, the image is reduced inward at the time of conversion from the real image height Y to the ideal image height Y'. In other words, the gain profile shown in FIG. 5 indicates that the distortion is of the bobbin type as shown in FIG. 3.

As described above, distortion can be visually grasped by defining the gain G as mentioned above.

1-3-2 Correction Rate

Next, a correction rate for correcting distortion is explained with reference to FIGS. 6 and 7.

Theoretically, distortion can be completely corrected using the gain G described above. However it may be more preferable not to completely correct distortion. A human being, for example, is likely to be not sensitive to the barrel-type distortion but more sensitive to the bobbin-type distortion. Further, the image that has the barrel-type distortion is somewhat roundish and thus could present the sense of "warmth".

Regarding the barrel-type distortion, for example, reduced rate of distortion correction allows the corrected image to include small distortion to generate an image having the warmth. On the other hand, regarding the bobbin-type distortion, increased rate of distortion correction allows the distortion to be completely removed from the corrected image to generate an image which is somewhat roundish and warm same as in case of the barrel-type distortion.

In view of this, the camera system 1 according to this embodiment has the function of regulating the distortion correction rate. Specifically, a gain TG which is the product of the gain G and the correction rate T is defined as the following Equation (4).

$$TG = (G-1) \times T + 1 = 1 - (C3 \times T) \times Y^2 - (C5 \times T) \times Y^4 - (C7 \times T) \times Y^6 \quad (4)$$

By using the gain TG in place of the gain G described above, the degree of distortion correction can be regulated. In a case where G>1, for example, the gain TG is smaller than the gain G when the correction rate T<1. In other words, in the case of the barrel-type distortion, the correction rate T smaller than 1 can reduce the degree of distortion correction as compared with that of the correction using the gain G.

On the other hand, in a case where G<1, the correction rate T smaller than 1 makes the gain TG smaller than the gain G. Specifically, in the case of the bobbin-type distortion, the degree of distortion correction using the gain TG is smaller than the case of the correction using the gain G.

Figure 6:
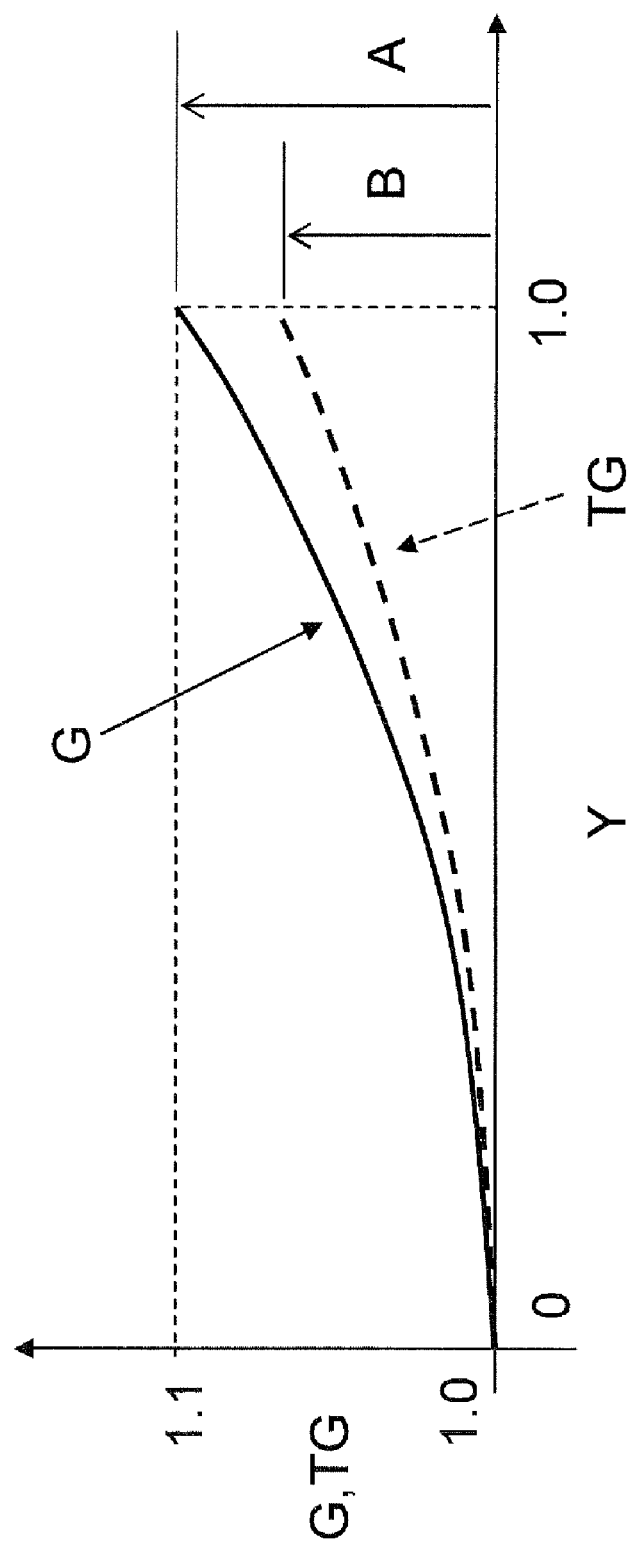
FIG. 6 is a diagram showing a gain TG for correcting the barrel-type distortion.
Figure 7:
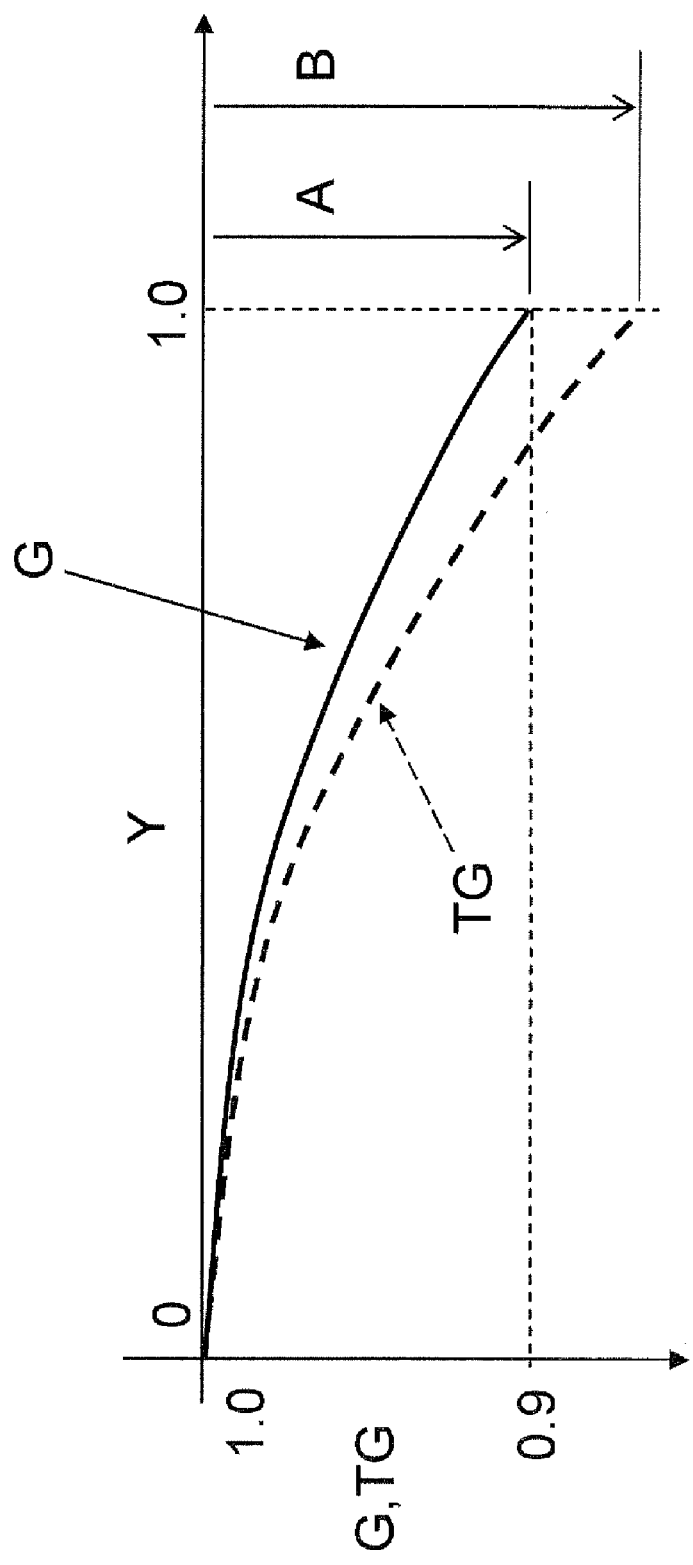
FIG. 7 is a diagram showing a gain TG for correcting the bobbin-type distortion.

In the aforementioned case, the profile of the gain TG can be expressed as shown in FIGS. 6 and 7, for example, where the correction rate T can be given by the following Equation (5).

$$T = \frac{B}{A} \quad (5)$$

1-3-3 Magnification Correction Value

Next, a magnification correction value for correcting distortion is explained with reference to FIGS. 8, 9A to 9C.

The camera system 1 according to this embodiment can correct distortion in accordance with characteristics of the optical system in the aforementioned method using information on the correction coefficients C3, C5, and C7 which are specific to the interchangeable lens 200 and stored in the flash memory 242.

However, in the case where the bobbin-type distortion is corrected, G<1, and therefore the corrected image is smaller than the real image. Therefore, under certain conditions, the corrected image becomes smaller than the CCD image sensor 110. Consequently, the image output from the CCD image sensor 110 may contain an area with missing information. This phenomenon is called a pixel defect.

Figure 8:
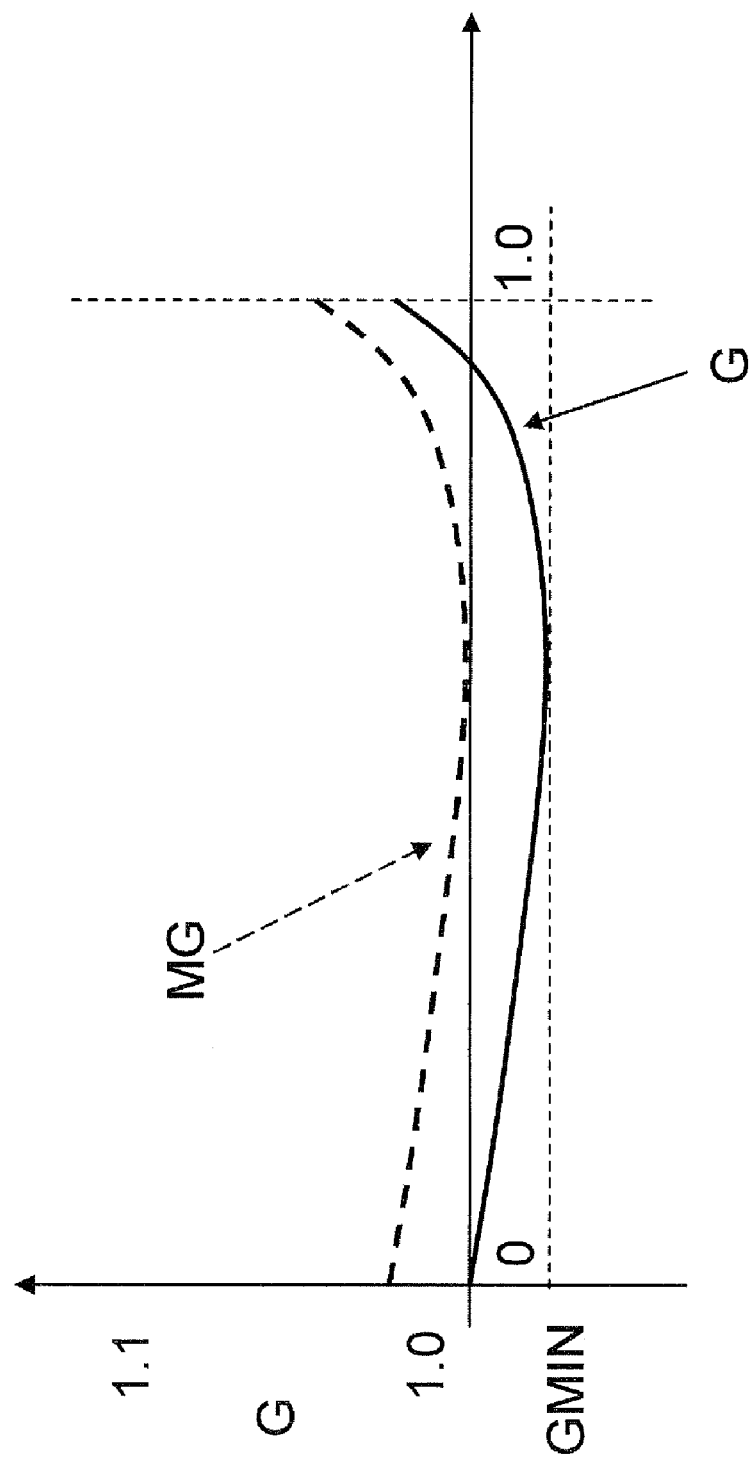
FIG. 8 is a diagram showing a gain MG.

In order to prevent occurrence of the pixel defect, the camera system 1 according to this embodiment uses a magnification correction value M for correcting the magnification of the entire image at the time of distortion correction. For example, by using the magnification correction value M, the gain G is corrected to make G larger than 1 within the range of "0≦real image height Y≦1" as shown in FIG. 8.

Specifically, the gain MG taking the magnification correction value M into consideration is defined by Equation (6).

$$MG = (1 - C3 \times Y^2 - C5 \times Y^4 - C7 \times Y^6) \times M \quad (6)$$

The minimum value is determined in the range of $0 \leq Y \leq 1$, and the gain profile is multiplied by the value M of which the minimum value is not less than 1. From Equation (7) for differentiating the gain G with the real image height Y, the minimum value can be obtained.

$$\frac{dG}{dY} = -2 \times C3 \times Y - 4 \times C5 \times Y^3 - 6 \times C7 \times Y^5 \quad (7)$$

Specifically, the solution (a, b, for example) with Equation (7) equal to zero is obtained, and the gains G for four points of Y=0, a, b, and 1 are compared with each other. As a result, the real image height Y for the smallest gain G can be obtained. From this real image height Y and Equation (7), the minimum value of the gain G can be obtained. Using the minimum value GMIN of the gain G, the magnification correction value M is set to satisfy $M \geq 1/GMIN$ so that the relation $MG \geq 1$ can be satisfied.

By setting the magnification correction value M as described above, the size of the corrected image can be kept not less than a predetermined size, so that the size of the corrected image can be prevented from being smaller than the size of the CCD image sensor 110. In this way, occurrence of the pixel defect can be prevented.

As described above, taking the correction rate T and the magnification correction value M into consideration, the final gain TMG is expressed by the following Equation (8).

$$TMG = \{1 - (C3 \times T) \times Y^2 - (C5 \times T) \times Y^4 - (C7 \times T) \times Y^6\} \times M \quad (8)$$

From Equations (8) and (3), Equation (9) for converting the real image height Y to the ideal image height Y' is given as shown below.

$$Y' = TMG \times Y = \{1 - (C3 \times T) \times Y^2 - (C5 \times T) \times Y^4 - (C7 \times T) \times Y^6\} \times M \times Y \quad (9)$$

An example of calculation with C3=0.2, C5=−0.2, C7=−0.1 and T=0.9 is explained below. Under this condition, from Equations (2) and (3), the distortion amount DY and the gain G are expressed by the following Equations (10) and (11).

$$DY(Y) = 0.2 \times Y^3 - 0.2 \times Y^5 - 0.1 \times Y^7 \quad (10)$$

$$G = -0.2 \times Y^2 + 0.2 \times Y^4 + 0.1 \times Y^6 \quad (11)$$

Figure 9A:
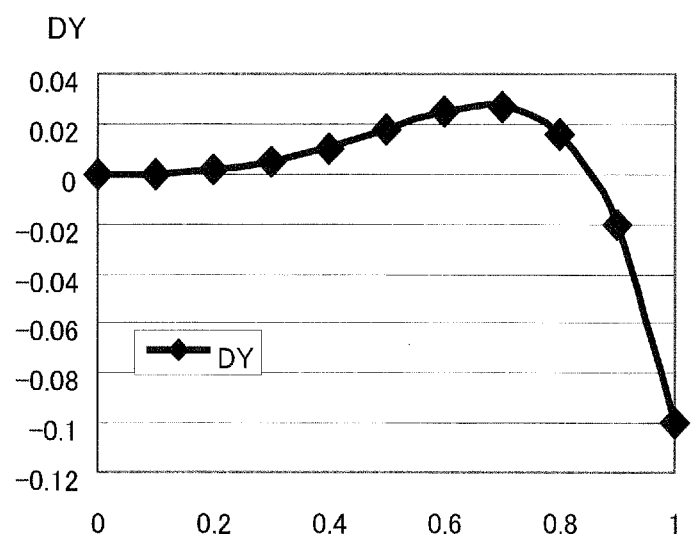
FIG. 9A is a diagram showing an example of a distortion amount DY.
Figure 9B:
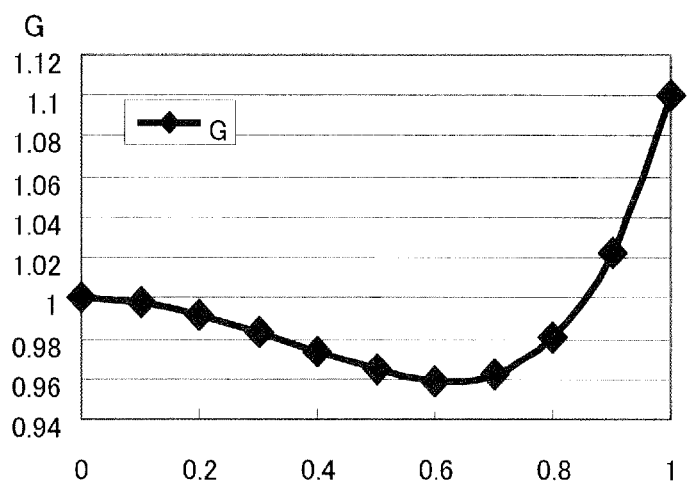
FIG. 9B is a diagram showing an example of the gain G.

Equations (10) and (11) can be expressed by the graphs of FIGS. 9A and 9B, respectively. To determine the minimum value of the gain G, Equation (11) is differentiated to obtain Equation (12) shown below.

$$\frac{dG}{dY} = -0.4 \times Y + 0.8 \times Y^3 + 0.6 \times Y^5$$
$$= 0.1 \times Y \times (6 \times Y^4 + 8 \times Y^2 - 4) \quad (12)$$

The minimum value of the gain G corresponds to a point where the gradient of the gain G is zero or Y=0 or 1. Assuming that $Z = Y^2$, the following quadratic equation can be obtained.

$$6 \times Y^4 + 8 \times Y^2 - 4 = 6Z^2 + 8Z - 4 = 0 \quad (13)$$

The solution of Equation (13) is Z=0.387426 and −1.72076.

In the case where the aspect ratio is 16:9, as a condition that no pixel defect occurs, the minimum value of the gain G in the range 0.49<Y<1 is the solution. As a result, Z=0.387426, i.e. Y=0.622435 can be obtained because of 0.2401<Z<1 and 0.49<Y<1.

For Y=0.49, 0.622435, or 1, the minimum value of the gain G is obtained for Y=0.622435 and this GMIN=0.95835 is obtained.

Therefore, from Equation (11), the gain function MG is given as follows.

$$MG = \frac{(1 - 0.2 \times Y^2 + 0.2 \times Y^4 + 0.1 \times Y^6)}{0.95835} \quad (14)$$

Finally, considering T=0.9, the gain function TMG shown below can be obtained from Equations (14) and (4).

$$TMG = 1.039114 - 0.18782 \times Y^2 + 0.18782 \times Y^4 + 0.09391 \times Y^6 \quad (15)$$

Figure 9C:
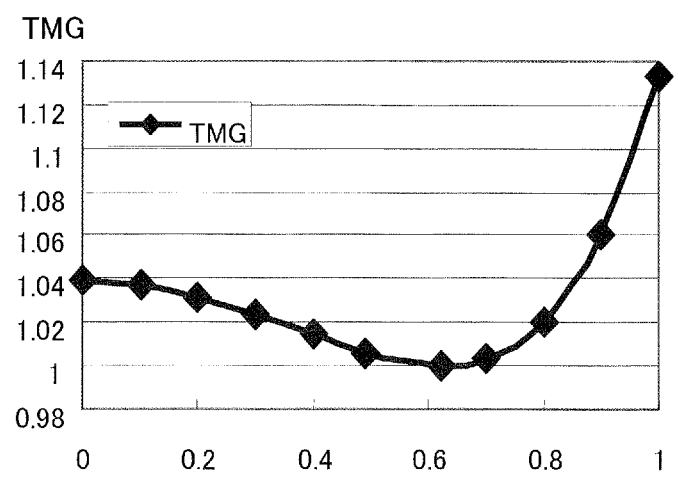
FIG. 9C is a diagram showing an example of a gain TMG.

Equation (15) can be expressed as shown in FIG. 9C. Referring to FIG. 9C, the gain TMG is not less than 1 in the range of "$0 \leq Y \leq 1$". Therefore, the bobbin-type distortion, if any, is corrected to enlarge the image so that generation of a pixel defect can be prevented.

As a result, the camera controller 140 can calculate the gain G and the gain TMG to correct the distortion of the image data captured by the CCD image sensor 110. Using the gain G and the gain TMG calculated in this way, the camera controller 140 corrects the distortion of the image data captured by the CCD image sensor 110.

1-3-4 Distortion Correction Information

Next, the distortion correction information is explained with reference to FIG. 10. In the distortion correction described above, the correction coefficients C3, C5, and C7 correspond only to one characteristic of the distortion.

However in the digital camera of interchangeable lens type, the specification of the optical system varies with the type of the interchangeable lens. Therefore, the correction coefficient is required to be selected in accordance with the optical system of the interchangeable lens mounted on the camera body.

Also, the distortion characteristic of the same optical system changes in accordance with the focal length or the position of the focus lens. Therefore, the correction coefficients C3, C5, and C7 are required to be selected in accordance with the focal length and the position of the focus lens.

In view of this, according to this embodiment, a correction coefficient table (first correction information) is stored in the flash memory 242 of the interchangeable lens 200. FIG. 10 shows a specific configuration of the correction coefficient table. As shown in FIG. 10, a correction coefficient table E of the lens controller 240 has zoom information ZENC, focus information FENC, plural correction coefficients C3, C5, and C7 and plural correction rates T. The correction coefficient table E, the zoom information ZENC, the focus information FENC, the correction coefficients C3, C5, and C7 and the correction rates T are examples of the information to correct the distortion.

In the correction coefficient table E, the correction coefficients C3, C5, and C7 and the correction rates T corresponding to the zoom information ZENC and the focus information FENC are arranged. The number of data on the zoom information ZENC is, for example, Nz+1, and the number of data on the focus information FENC is, for example, Nf+1.

In accordance with the zoom information ZENC and the focus information FENC, the correction coefficients C3, C5, and C7 and the correction rates T can be selected from the correction coefficient table E. Using the correction coefficients C3, C5, and C7 and the correction rates T thus selected, the distortion can be corrected in a way suitable to the state of the used interchangeable lens 200.

The lens controller 240 transmits the correction coefficient table E stored in the flash memory 242 to the camera controller 140. The camera controller 140 using the correction coefficient table E thus received calculates the gain G for correcting the distortion, and corrects the distortion of the image data captured by the CCD image sensor 110 using the gain G thus calculated. The various operations of the camera system 1 according to this embodiment are described below.

1-4 Operations

First, the initializing operation as the operation performed when the camera system 1 is switched on is explained. Incidentally, the specifics of the initializing operation are varied depending on the number of times the interchangeable lens is mounted to the camera body in the past.

1-4-1 Initializing Operation 1 (on First Mounting of Interchangeable Lens)

The initializing operation of the camera system 1 according to this embodiment is explained with reference to FIG. 11. Especially, the initializing operation described below is performed with the interchangeable lens 200 mounted to the camera body 100 for the first time.

Figure 11:
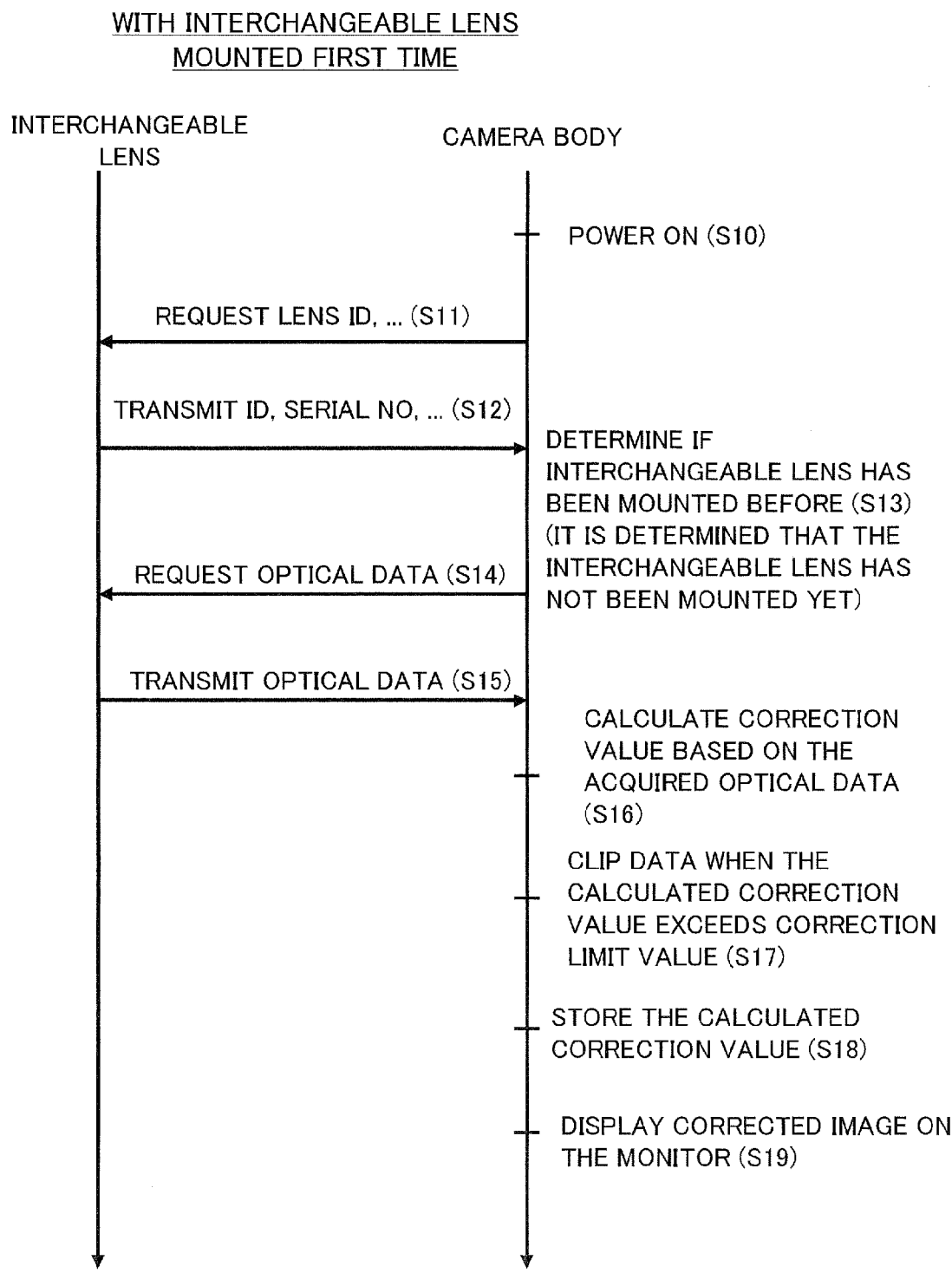
FIG. 11 is a diagram for explaining an initializing operation (first operation).

FIG. 11 is a diagram for explaining information exchange between the camera body 100 and the interchangeable lens 200 during the initializing operation. A user operates a power button (not shown) on the camera body 100 to power on (turn on) the camera system 1 (S10). When the camera system 1 is powered on, the initializing operation of the camera system 1 is started.

Upon start of the initializing operation, the camera body 100 first transmits a request signal to the interchangeable lens 200 for requesting information such as the lens ID of the interchangeable lens 200 (S11). Upon reception of the request signal for requesting the information such as the lens ID, the interchangeable lens 200 transmits information such as lens ID, serial number and version to the camera body 100 (S12).

Upon reception, i.e. acquisition of the information such as lens ID, the camera controller 140 determines whether the gain G and the gain TMG corresponding to the acquired lens ID is stored in the flash memory 142 or not (S13). In this case, since the interchangeable lens 200 is assumed to have been mounted for the first time in this case, the camera controller 140 determines that the gain G and the gain TMG corresponding the obtained ID are not stored in the flash memory 142.

In this case, the camera body 100 transmits a request signal for requesting the interchangeable lens 200 to send optical data, such as the correction coefficient table, indicating the optical characteristics of the interchangeable lens 200 (S14). Upon reception of the request signal, the interchangeable lens 200 transmits the optical data such as the correction coefficient table to the camera body 100 (S15).

Upon acquisition (reception) of the optical data such as the correction coefficient table, the camera controller 140 calculates correction values for correcting distortion such as the gain G and the gain TMG according to the aforementioned method based on the acquired correction coefficient table (S16).

Figure 12:
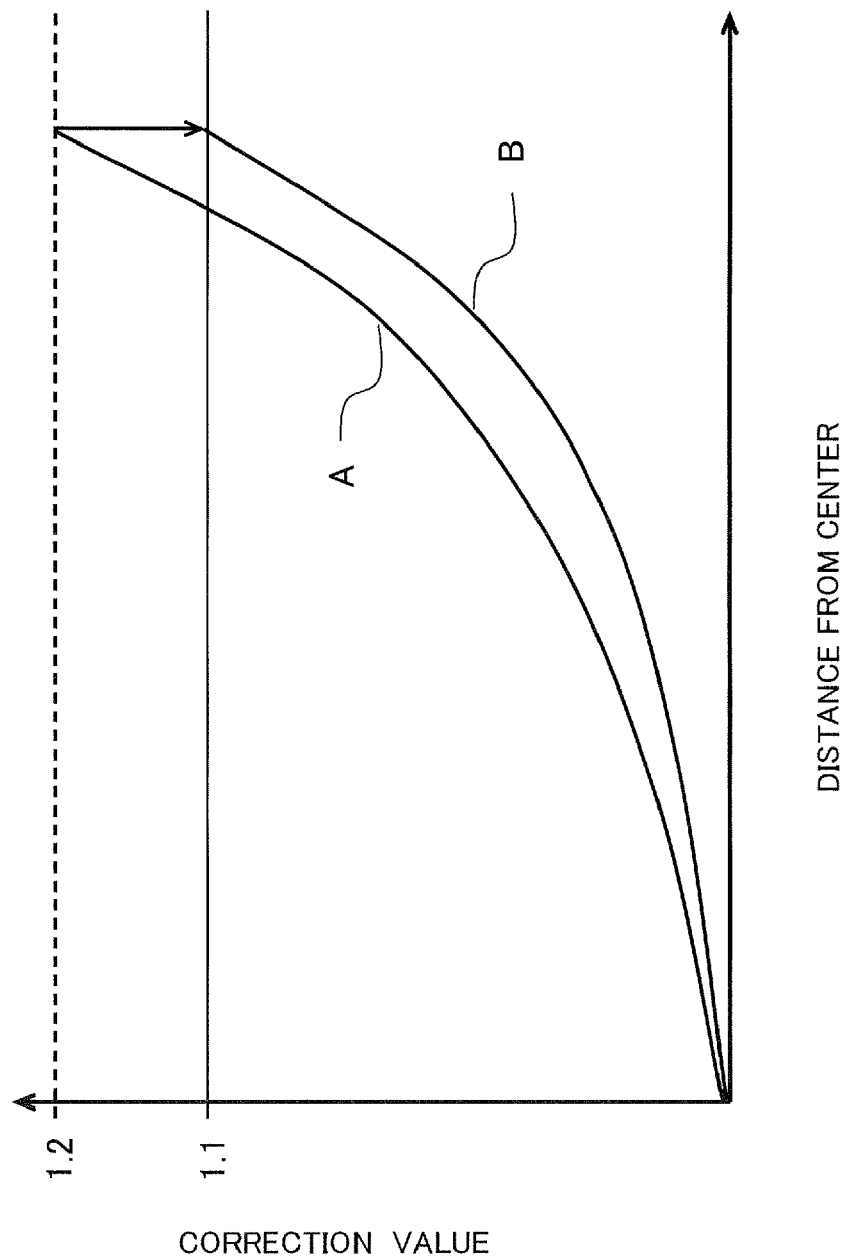
FIG. 12 is a schematic diagram for explaining a clip process executed in a case where the gain G exceeds a limit value.

When the correction value is calculated, the camera controller 140 determines whether the calculated correction value exceeds a limit of correction of the distortion for the camera body 100 or not. When determining that the calculated correction value exceeds the limit of distortion correction, the camera controller 140 multiplies the calculated correction value by the correction rate (suppresses the calculated correction value) thereby to adjust the correction value within the range of the distortion correction limit (S16). Specifically, as shown in FIG. 12, by multiplying the calculated correction value by the correction rate, the correction value is adjusted within the limit of the distortion correction by the camera controller 140.

For example, it is assumed that the camera controller 140 of the camera system 1 according to this embodiment can correct distortion up to 10%. In this case, it is further assumed that the gain G (correction value) calculated by the camera controller 140 is 1.2. Then, the gain G (correction value) is indicated by a curve A shown in FIG. 12. In a case where the image data captured by the CCD image sensor 110 is corrected with the gain G indicated by the curve A, the distortion can theoretically be completely corrected. However, the camera system 1 according to this embodiment can correct distortion of the image data only up to 10%, and therefore the gains G for each distance from the center position is multiplied by 1.1/1.2 as a correction rate so that the correction value indicated by a curve B can be obtained. According to the gain G indicated by the curve B, for every distance from the center, the correction of more than 10% is not made, and thus the gain G indicated by the curve B means a value (correction value) within the limit of the correction distortion by the camera controller 140. As a result, the camera system 1 according to this embodiment can correct the distortion in maximum even for an interchangeable lens for which distortion cannot be completely corrected. The rate of 10% up to which the camera system 1 according to this embodiment can correct distortion is determined based on the specification. Therefore, the rate is not necessarily 10%, but may be either 15% or 20%, if so determined in the specification.

On the other hand, when determining that the calculated correction value is within the range of the limit of distortion correction, the camera controller 140 stores the calculated gain G (correction value) which is associated with the ID of the interchangeable lens 200 in the flash memory 142 (S18). The camera controller 140 also associates the gain G (correction value) set within the range of the distortion correction limit by multiplying the correction rate with the ID of the interchangeable lens 200, and stores the gain G in the flash memory 142 (S18).

After that, the camera controller 140 using the gain G stored in the flash memory 142 corrects the distortion of the image data captured by the CCD image sensor 110. During this period, an image indicated by the image data captured by the CCD image sensor 110 is not displayed on the LCD monitor 120. In other words, the live view function is stopped.

When the process of correcting distortion is completed and the image data subjected to distortion correction is generated, the LCD monitor 120 starts to display the image indicated by the image data subjected to distortion correction (S19). In other words, the live view function is started. In this way, in the camera system 1 according to this embodiment, the LCD monitor 120 does not display the distorted image before correction indicated by the image data captured by the CCD image sensor 110 until the distortion correction of the image data captured by the CCD image sensor 110 is completed.

As described above, in the camera system 1 according to this embodiment, when the gain G for distortion correction which is calculated based on the optical data acquired from the interchangeable lens 200 exceeds the limit of the distortion correction, the camera controller 140 multiplies the calculated gain G by the correction rate (for suppressing gain G) to keep the gain G within the range of the distortion correction limit. In this manner, even when the distortion due to the optical characteristic of the mounted interchangeable lens exceeds the limit of distortion correction by the camera controller 140, the distortion of the image data captured by the CCD image sensor 110 can be corrected in a comparatively appropriate correcting way.

Also, in the camera system 1 according to this embodiment, the LCD monitor 120 does not display the image until the distortion correction of the image data captured by the CCD image sensor 110 is completed even when the image data captured by the CCD image sensor 110 is ready for display on the LCD monitor 120 after power on of the camera system 1. Specifically, the live view function is stopped before completion of the distortion correction of the image data, and the live view function is started after completion of correction of the distortion of the image data. As a result, a comparatively poor-looking image before completed distortion correction can be prevented from being presented to a user.

1-4-2 Initializing Operation 2 (on n-th Mounting of the Same Interchangeable Lens (n≧2))

Another initializing operation of the camera system 1 according to this embodiment is explained with reference to FIG. 13. The initializing operation described below is performed as n-th (n: integer of 2 or more) mounting of the same interchangeable lens. Specifically, this initializing operation is performed when mounting the interchangeable lens 200 that has ever been mounted on the camera body 100 before power-on of the camera system 1.

FIG. 13 is a diagram for explaining information exchange between the camera body 100 and the interchangeable lens 200 in the initializing operation. A user operates a power button (not shown) on the camera body 100 to power on the camera system 1 (S20). When the camera system is powered on (S20), the initializing operation of the camera system 1 is started.

Upon start of the initializing operation, the camera body 100 first transmits a request signal to the interchangeable lens 200 for requesting information such as the lens ID of the interchangeable lens 200 (S21). Upon reception of the request signal for requesting the information such as the lens ID, the interchangeable lens 200 transmits information such as lens ID, serial number and version to the camera body 100 (S22).

The camera controller 140 upon reception of the information such as the ID determines whether the gain G and the gain TMG corresponding to the received ID are stored in the flash memory 142 or not (S23). The initializing operation in this case is assumed to be the n-th (n≧=2) initializing operation with the same interchangeable lens 200 mounted, and therefore the camera controller 140 determines that the gain G and the gain TMG corresponding to the received ID are stored in the flash memory 142. It is noted that in this embodiment, the flash memory 142 stores information, such as the gain G, corresponding to one ID.

The camera controller 140 which determines that the gain G and the gain TMG corresponding to the received ID are stored in the flash memory 142 corrects the distortion of the image data captured by the CCD image sensor 110, based on the gain G and the gain TMG stored in the flash memory 142 (S24).

Upon completion of the distortion correction of the image data, the LCD monitor 120 displays the image indicated by the image data after completion of the distortion correction (S25). In this way, it is configured that the image indicated by the image data captured by the CCD image sensor 110 is not displayed on the LCD monitor 120 before completion of correction of the distortion.

As described above, in the camera system 1 according to this embodiment, the flash memory 142 stores the gain G and the gain TMG for distortion correction calculated by the camera controller 140, with the gain G and the gain TMG associated with the ID of the mounted interchangeable lens. Also, the camera controller 140 does not calculate again the gain G and the gain TMG for distortion correction corresponding to the mounted interchangeable lens, if they are already stored in the flash memory 142. In such a case, the camera controller 140 corrects the distortion of the image data captured by the CCD image sensor 110, using the gain G and the gain MG already stored in the flash memory 142. As a result, the camera controller 140 is not required to calculate the gain G and the gain TMG for distortion correction based on the optical data of the interchangeable lens 200 at every initializing operation. Accordingly, when the interchangeable lens that has ever been mounted is mounted to the camera system 1 again, the camera system 1 can finish the initializing operation in a comparatively short time. Furthermore, the camera system 1 according to this embodiment can display the image indicated by the image data after distortion correction on the LCD monitor 120 comparatively quickly after mounting the interchangeable lens that has ever been mounted.

In the camera system 1 according to this embodiment, the flash memory 142 stores the correction value for distortion correction and the ID of the interchangeable lens in correspondence with each other. Nevertheless, this configuration is not necessarily required, and the flash memory 142 may store the distortion correction value and the serial number of the interchangeable lens in correspondence with each other. By doing so, the delicate optical characteristic different from each other in the interchangeable lenses of the same ID can be also appropriately corrected for each interchangeable lens.

Also, the flash memory 142 may store the correction value for distortion correction and the version information of the interchangeable lens in correspondence with each other. This arrangement can handle distortion correction of the interchangeable lens of which optical characteristic information can be upgraded through the Internet. Specifically, when the optical characteristic data is changed by upgrading the version of the interchangeable lens after the correction value for distortion is calculated last, the camera controller 140 calculates the correction value for distortion again and corrects the distortion using the calculated correction value so that the distortion can be corrected more properly.

1-4-3 Distortion Correction and Image Display in Demounting Interchangeable Lens (First Example Operation)

The operation of the camera system 1 according to this embodiment to correct the distortion and display the image in demounting the interchangeable lens 200 from the camera body 100 which is powered on is explained with reference to FIGS. 14, 15A to 15D.

FIG. 14 is a flowchart for explaining the operations of distortion correction in demounting the interchangeable lens 200 from the camera body 100. FIGS. 15A to 15D are diagrams for explaining the change in the distortion correct operation in demounting the interchangeable lens 200 from the camera body 100.

A mechanism for detecting mounting state of the interchangeable lens 200 to the camera body 100 is explained. The camera system 1 according to this embodiment is configured to confirm the mounting state of the interchangeable lens 200 to the camera body 100 (completely demounted or being mounted/demounted) in accordance with a predetermined specification. The camera body 100 and the interchangeable lens 200 have connection check terminals 11 and 21, respectively, for recognizing the electrical connection between the camera body 100 and the interchangeable lens 200. The camera body 100 also has the lock pin 15 to confirm that the interchangeable lens 200 is connected mechanically to the camera body 100. The lock pin 15 is arranged to turn off when the interchangeable lens 200 is completely mounted to or completely demounted from the camera body 100, and to turn on when the interchangeable lens 200 is in the process of being mounted to the camera body 100. That is, by using the connection check terminals 11 and 21, it is possible to detect whether the interchangeable lens is in conformity with the predetermined specification or not. The lock pin 15 makes it possible to detect the mechanical connection between the interchangeable lens 200 and the camera body 100. The connection check terminals 11 and 21 and the lock pin 15 are examples of such a detection unit, and any alternative mechanism capable of detecting the connection state intended by this embodiment can be used.

Figure 15A:
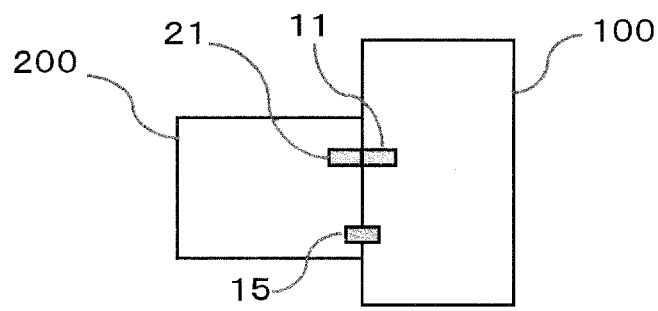
FIG. 15A is a diagram for explaining a state in which the interchangeable lens is completely mounted to a camera body (state A).

FIG. 15A shows the state in which the interchangeable lens 200 is completely mounted to the camera body 100. This state is hereinafter referred to as a "state A". In the state A, the connection check terminals 11 and 21 for electrically recognizing the connection between the camera body 100 and the interchangeable lens 200 are on, and the lock pint 15 for mechanically recognizing the connection between the camera body 100 and the interchangeable lens 200 is off. In other words, the state A is a state in which the camera body 100 and the interchangeable lens 200 are connected completely to each other electrically and mechanically.

In the state A shown in FIG. 15A, the camera controller 140 corrects the distortion of the image data captured by the CCD image sensor 110 (S100). The camera controller 140 also controls the LCD monitor 120 to display the image indicated by the image data subjected to distortion correction.

In a state where the distortion is corrected and the image indicated by the image data subjected to distortion correction is displayed on the LCD monitor 120, the camera controller 140 monitors whether the lock pin 15 is turned on or not (S110).

Figure 15B:
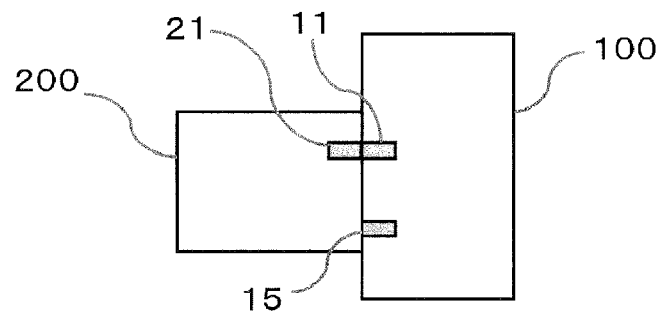
FIG. 15B is a diagram for explaining a state in which the interchangeable lens is being mounted/demounted (state B).

When rotation of the interchangeable lens 200 starts from the state in which the interchangeable lens 200 is completely mounted to the camera body 100 in order to demount the interchangeable lens 200, the lock pin 15 is turned on while the connection check terminals 11 and 12 remaining on. This state is shown in FIG. 15B, and hereinafter referred to as a "state B". In the state B, the lock pin 15 is on but the camera body 100 and the interchangeable lens 200 are still connected electrically to each other. In other words, the state B is a state in which the interchangeable lens 200 is being mounted, and the interchangeable lens 200 and the camera body 100 are connected incompletely to each other.

When the camera system 1 enters the state B and the lock pin 15 is turned on, the camera controller 140 corrects the distortion of the image data captured by the CCD image sensor 110 (S120). The camera controller 140 also controls the LCD monitor 120 to display the image indicated by the image data subjected to distortion correction (S120). Specifically, also in the state B shown in FIG. 15B, the distortion of the image data captured by the CCD image sensor 110 is corrected, and the image indicated by the image data subjected to distortion correction is displayed on the LCD monitor 120.

In the state B, the camera controller 140 determines whether the connection check terminal 11 of the camera body 100 is electrically connected or not to the connection check terminal 21 of the interchangeable lens 200 (S130).

Figure 15C:
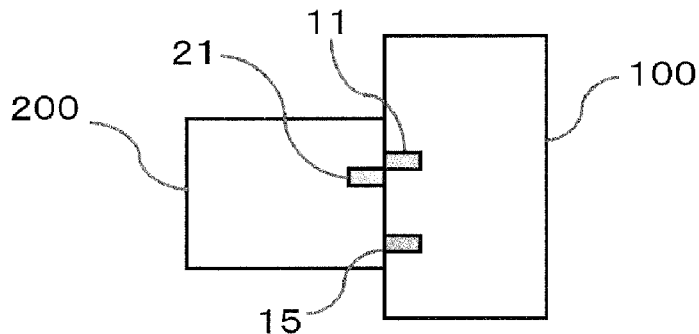
FIG. 15C is a diagram for explaining another state in which the interchangeable lens is being mounted/demounted (state C).

With further rotation of the interchangeable lens 200 from the state B, the connection check terminal 11 of the camera body 100 is electrically disconnected from the connection check terminal 21 of the interchangeable lens 200. This state is shown in FIG. 15C. This state is hereinafter referred to as a "state C". In the state C, the lock pin 15 is on, and the connection check terminal 11 and the connection check terminal 21 are not electrically connected to each other (off state). In other words, the state C is a state in which the interchangeable lens 200 is in the process of being connected, and the interchangeable lens 200 and the camera body 100 are incompletely connected to each other.

Even in the case where the camera system 1 enters the state C and the electrical disconnection between the connection check terminals 11 and 21 is not recognized, the camera controller 140 corrects the distortion of the image data captured by the CCD image sensor 110 (S140) and controls the LCD monitor 120 to display the image indicated by the image data subjected to distortion correction (S140). In other words, even in the state C shown in FIG. 15C, the distortion of the image data captured by the CCD image sensor 110 is corrected and the image indicated by the image data subjected to distortion correction is displayed on the LCD monitor 120.

The distance in the states B and C between the lens system in the interchangeable lens 200 and the CCD image sensor 110 is same as that in the state A (when the interchangeable lens 200 is completely mounted). Therefore the image indicated by the image data subjected to distortion correction is displayed on the LCD monitor 120 in each of the states B and C, so that a user can confirm the image on the LCD monitor 120 even while the user is demounting the interchangeable lens.

After that, the camera controller 140 determines whether the lock pin 15 is turned off or not.

Figure 15D:
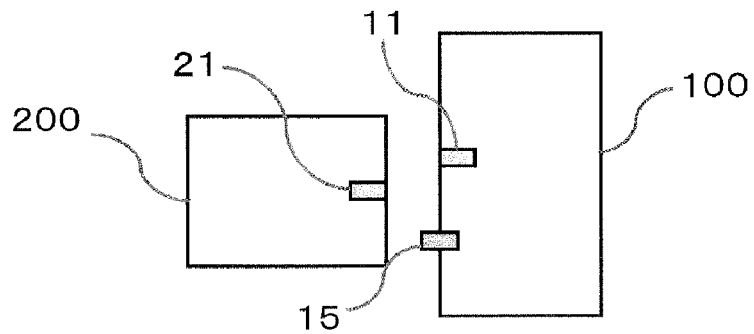
FIG. 15D is a diagram for explaining a state in which the interchangeable lens is completely demounted from the camera body (state D).

When the interchangeable lens 200 is further rotated from the state C and is completely demounted from the camera body 100, the lock pin 15 is turned off. FIG. 15D shows this state. This state is hereinafter referred to as a "state D". In the state D, the lock pin is off and the connection check terminals 11 and 12 are not electrically connected to each other (off state). In other words, in the state D, the camera body 100 and the interchangeable lens 200 are completely disconnected electrically and mechanically.

When the camera system 1 enters the state D and the lock pin is determined to be off, the camera controller 140 stops the distortion correction of the image data captured by the CCD image sensor 110 (S160). The camera controller 140 also controls the LCD monitor 120 to display the image data captured by the CCD image sensor 110 that is not corrected the distortion (S160). Specifically, in the state D shown in FIG. 15D, the distortion correction of the image data captured by the CCD image sensor 110 is stopped, and the image indicated by the image data not corrected the distortion is displayed on the LCD monitor 120.

The reason why the camera controller 140 stops the correction of distortion in the state D is explained below. In the state D where the camera body 100 and the interchangeable lens 200 are disconnected completely from each other electrically and mechanically, the image indicated by the image data captured by the CCD image sensor 110 is blurred and it may be hard to visually recognize what is imaged. Correction of the distortion of such blurred image data is meaningless since the image indicated by the blurred image data after correction is also blurred. In the state D, therefore, the camera system 1 according to this embodiment stops the distortion correction of the image data captured by the CCD image sensor 110. In the states A, B and C, the image may be somewhat blurred but it is possible to sufficiently recognize what is imaged.

As described above, in the camera system 1 according to this embodiment, the camera controller 140 corrects the distortion of the image data captured by the CCD image sensor 110 and controls the LCD monitor 120 to display the image indicated by the image data subjected to correction unless the camera body 100 and the interchangeable lens 200 are completely disconnected from each other electrically and mechanically. As the result of this operation, the Camera system 1 can always correct distortion as long as there is high possibility in which the CCD image sensor 110 captures the image which is visually recognizable by a user.

Although in the above description the display of the image is stopped in the states B and C, the display of the image may be continued in the state B and the display of the image may be stopped in the state C. By displaying the image in the state B, the image does not disappear even when the lock pin 15 is carelessly depressed by a user, so that the convenience for the user is not hampered. At the timing the state changes from B to C, it can be considered that the user's intention to demount the lens is confirmed. Thus, it is not problem to stop the display of the image in the state C.

1-4-4 Distortion Correction and Image Display in Demounting the Interchangeable Lens (Second Example Operation)

Figure 16:
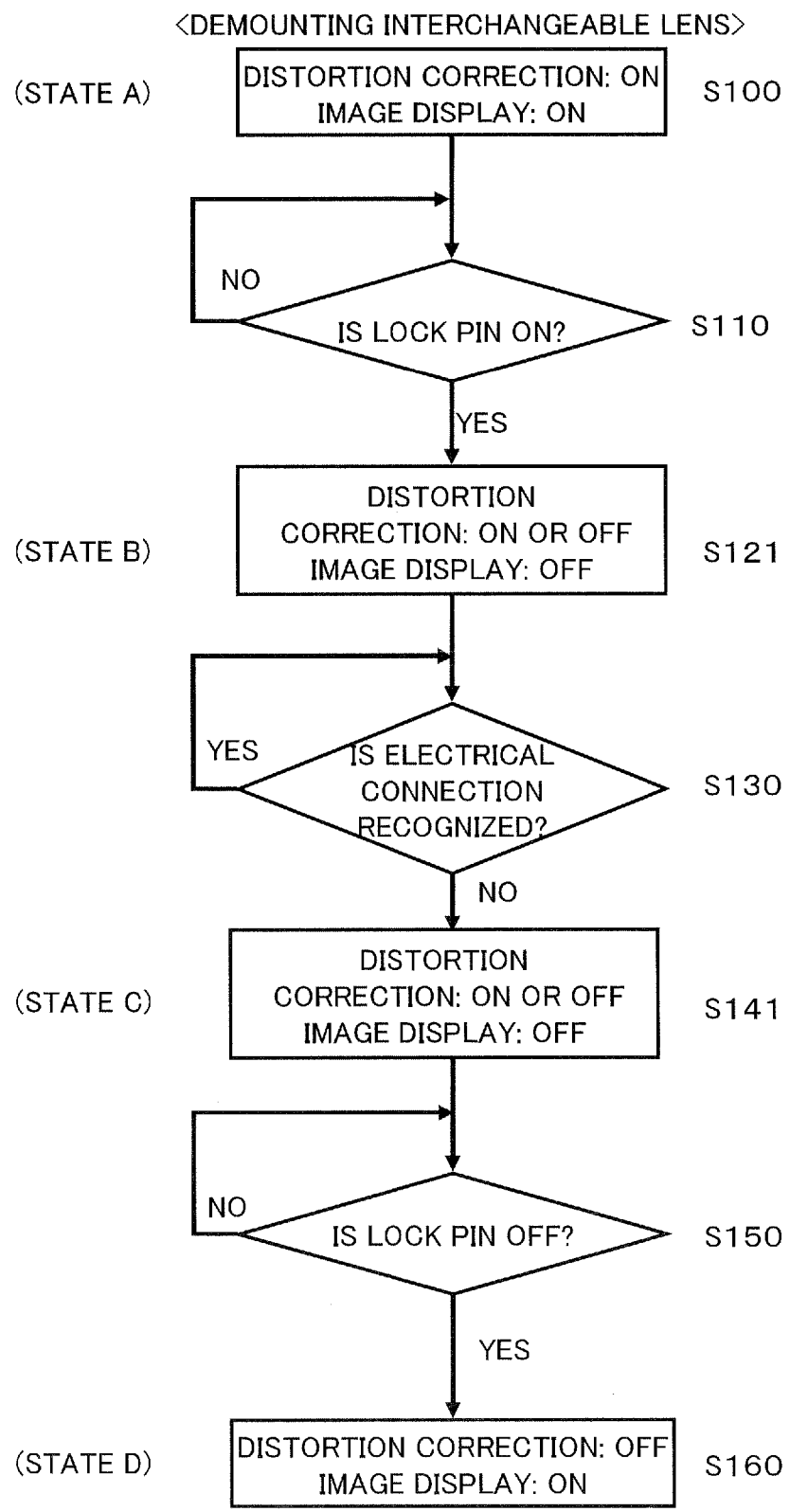
FIG. 16 is a flowchart for explaining the distortion correction process and the image display process in demounting the interchangeable lens (second example processing).
Figure 17:
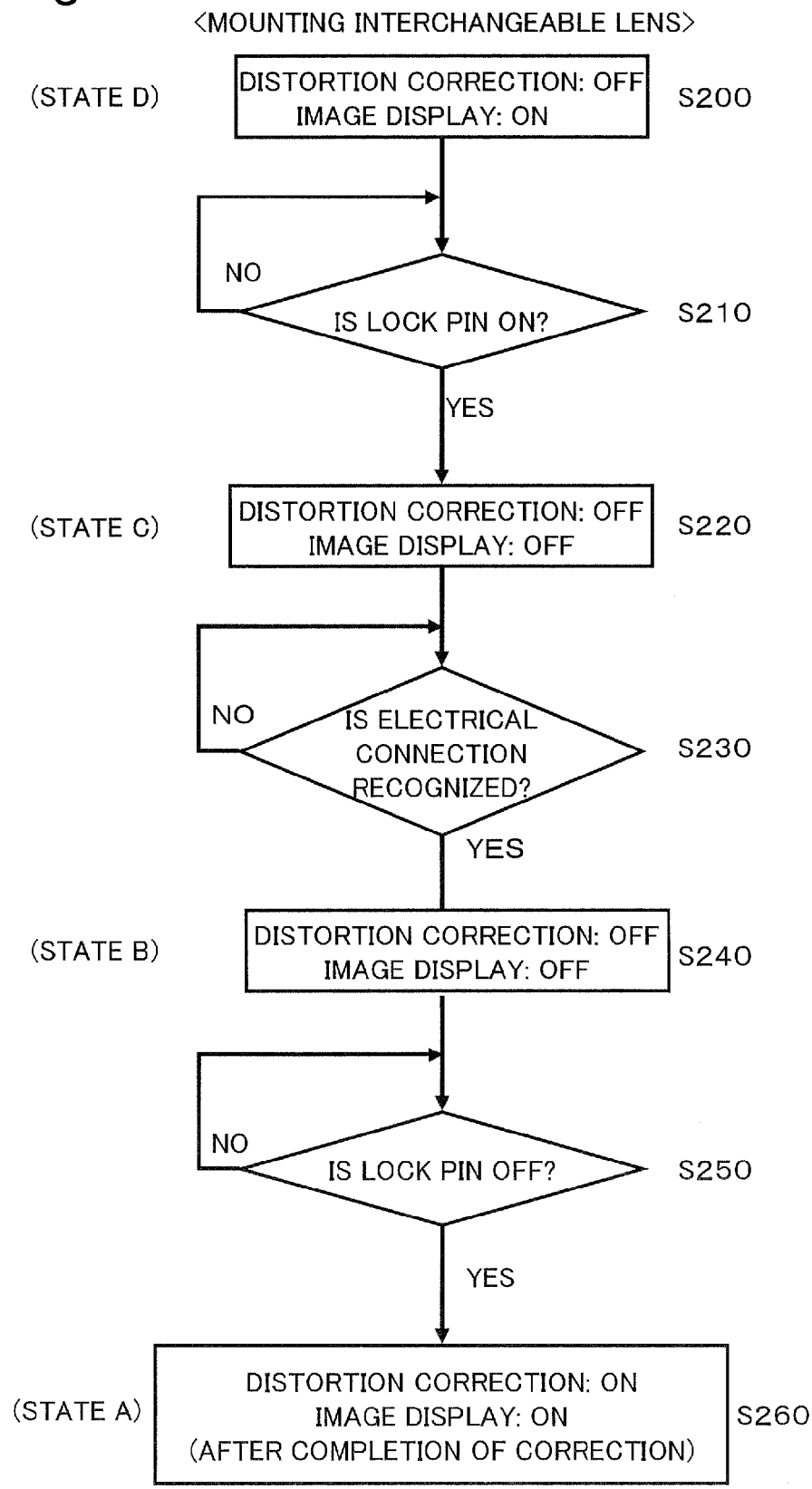
FIG. 17 is a flowchart for explaining a distortion correction process and an image display process in mounting the interchangeable lens.

Another example operation (second example operation) of the distortion correction and the image display done in demounting the interchangeable lens is explained with reference to FIG. 16. The aforementioned example operation (first example operation) with reference to FIG. 14 is controlled to display the image on the LCD monitor 120 in the states B and C (while the interchangeable lens is being demounted) (steps S120 and S140 in FIG. 14). In the second example operation, in contrast, the camera controller 140 prevents the LCD monitor 120 from displaying the image based on the image data captured by the CCD image sensor 110 in the states B and C (steps S121 and S141 in FIG. 16). In the process, the camera controller 140 may or may not correct the image distortion of the image data captured by the CCD image sensor 110.

1-4-5 Distortion Correction and Image Display in Mounting the Interchangeable Lens The operations of correcting the image distortion and of displaying the image in mounting the interchangeable lens 200 to the camera body 100 in the camera system 1 which is powered on according to this embodiment are explained with reference to FIGS. 17 and 15A to 15D.

The operations of correcting the distortion and image display in mounting the interchangeable lens 200 with the camera system 1 powered on is basically opposite of the operations in demounting the interchangeable lens 200. Specifically, in case of mounting the interchangeable lens 200, the state of the camera system 1 changes from the states D, C, B, to A in this order.

In the state D with the interchangeable lens 200 completely demounted from the camera body 100, the lock pin 15 is off, and the connection check terminals 11 and 21 are in the state where they are not electrically connected to each other (off state). Under this condition, the camera controller 140 stops correcting the distortion of the image data captured by the CCD image sensor 110 (S200). Further, the camera controller 140 controls the LCD monitor 120 to display the image data which is captured by the CCD image sensor 110 but is not corrected the distortion (S200).

When a user brings the interchangeable lens 200 into contact with the camera body and starts rotating the interchangeable lens 200 at the state D, the state is shifted to state C in which the connection check terminal 11 of the camera body 100 is not electrically connected to the connection check terminal 21 of the interchangeable lens 200 and the lock pin 15 is turned on (S210).

In the state C, the camera controller 140 does not correct the distortion of the image data captured by the CCD image sensor 110 and controls the LCD monitor 120 to stop displaying the image data which is captured by the CCD image sensor 110 and not corrected the distortion (S220).

With further rotation of the interchangeable lens 200 for mounting the lens from the state C, the state is shifted to the state B in which the electrical connection between the connection check terminals 11 and 21 is recognized with the lock pin 15 kept on (S230).

Also in the state B, the camera controller 140 does not correct the distortion of the image data captured by the CCD image sensor 110 (S240) while preventing the LCD monitor 120 from displaying the image indicated by the image data which is captured by the CCD image sensor 110 but is not corrected the distortion (S240).

As described above, in the states B and C, the camera controller 140 prevents the LCD monitor 120 from displaying the image not corrected the distortion, with the result that a user is prevented as far as possible from viewing the distorted image while the interchangeable lens being mounted.

With further rotation of the interchangeable lens 200 from the state B, the lock pin is turned off (S250), and the camera system 1 enters the state A. In the state A, the camera controller 140 starts correcting the distortion of the image data captured by the CCD image sensor 110 (S260). In the process, the camera controller 140 prevents the LCD monitor 120 from displaying the image indicated by the image data captured by the CCD image sensor 110 until the correction of the image distortion is completed, and controls the LCD monitor 120 to display the image indicated by the corrected image data after the distortion correction is completed (S260).

As described above, even after the interchangeable lens 200 is completely mounted to the camera body 100, the image is not immediately displayed on the LCD monitor 120, and the LCD monitor 120 begins to display the image upon completion of the distortion correction. As a result, a user is prevented as far as possible from viewing the distorted image before distortion correction.

In the examples explained above with reference to FIGS. 14, 16 and 17, the image is displayed in the state D. The reason is as follows. In a case where an interchangeable lens which is not conformity with a predetermined standard (i.e. a predetermined specification) is mounted to the camera body 100, the electrical connection as described above is not confirmed even though the interchangeable lens is completely mounted to the camera body 100. In such a case, if the image indicated by the image data captured by the CCD image sensor 110 is not displayed on the LCD monitor 120, a user cannot visually recognize a through image and feels inconvenience. For this reason, it is controlled so that the image is displayed on the LCD monitor 120 in the state D.

1-5 Summary of the Embodiment

The camera system 1 according to this embodiment includes the interchangeable lens 200 and the camera body 100. The interchangeable lens 200 includes the flash memory 242 for storing optical data indicating the characteristics of the optical system of the interchangeable lens 200. The camera body 100 includes the CCD image sensor 110 for generating image data by capturing an object image, the body mount 150 for acquiring the optical data from the interchangeable lens 200, the camera controller 140 for calculating a correction value to correct the image data generated by the CCD image sensor 110 based on the optical data acquired through the body mount 150, and the flash memory 142 for storing the correction value calculated by the camera controller 140.

As a result, the camera controller 140 is not required to calculate a gain G and a gain TMG for distortion correction based on the optical data of the interchangeable lens 200 at every initializing operation. Accordingly, the camera system 1 according to this embodiment can finish the second and subsequent initializing operations in a comparatively short time with the same interchangeable lens mounted to the camera body 100.

Also, the camera system 1 according to this embodiment includes the interchangeable lens 200 and the camera body 100. The interchangeable lens 200 includes the flash memory 242 for storing optical data. The camera body 100 includes the CCD image sensor 110 for generating image data by capturing an object image, the body mount 150 for acquiring the optical data from the interchangeable lens 200, and the camera controller 140 for correcting the image data generated by the CCD image sensor 110, which calculates a correction value to correct the image data generated by the CCD image sensor 110 based on the optical data acquired by the body mount 150, and which suppresses the correction value within a range correctable by the camera controller 140 when the correction value calculated by the camera controller 140 exceeds the correctable range by the camera controller 140. The camera controller 140 corrects the image data generated by the CCD image sensor 110 based on the correction value calculated by the camera controller 140.

With the aforementioned configuration, even when the distortion caused by the optical characteristics of the mounted interchangeable lens exceeds the limit of distortion correction by the camera controller 140, the camera system 1 according to this embodiment can correct the distortion of the image data captured by the CCD image sensor 110 in a comparatively appropriate way.

Also, the camera body 100 of the camera system 1 according to this embodiment can be mounted with the interchangeable lens 200, and includes the CCD image sensor 110 for generating image data by capturing an object image formed through the interchangeable lens 200, the body mount 150 for acquiring optical data from the interchangeable lens 200, the camera controller 140 for correcting the image data generated by the CCD image sensor 110 based on the optical data acquired through the body mount 150, and the LCD monitor 120 for displaying an image based on the image data. After the camera body 100 is powered on, the LCD monitor 120 stops displaying the image based on the image data generated by the CCD image sensor 110 until the camera controller 140 completes correction of the image data generated by the CCD image sensor 110.

With this configuration, the camera system 1 according to this embodiment prevents a user from viewing a comparatively poor-looking image of which distortion is not completely corrected.

Furthermore, the camera body 100 of the camera system 1 according to this embodiment can be mounted with the interchangeable lens 200, and includes the CCD image sensor 110 for generating image data by capturing an object image, the body mount 150 for acquiring optical data from the interchangeable lens 200, and the camera controller 140 for correcting the image data generated by the CCD image sensor 110 based on the optical data acquired through the body mount 150, which detects that the interchangeable lens 200 is mounted or demounted. Upon detection of the interchangeable lens 200 being mounted or demounted, the camera controller 140 stops correction of the image data.

With this configuration, when there is high possibility in which the CCD image sensor 110 has captured an image that is visually recognizable by a user, the camera system 1 according to this embodiment can always correct distortion.

2. Other Embodiments

The first embodiment is specifically described as above. However, an embodiment is not limited to the aforementioned embodiment. Other embodiments are explained briefly below.

According to the first embodiment, the LCD monitor 120 is prevented from displaying an image before distortion correction of the image is completed (the live view function is stopped). However, as long as the distorted image before correction is not displayed on the LCD monitor 120, a predetermined message; a still image, or the like may be displayed before completion of the correction.

In the camera system 1 according to the first embodiment, the distortion is corrected. However, the embodiment is not necessarily limited to such distortion correction. This embodiment is also applicable to correction for chromatic aberration or shading. As a result, the chromatic aberration and the shading can also be efficiently corrected.

According to the first embodiment, the camera body without a movable mirror is illustrated. However, the camera body is not limited to such a structure. For example, a movable mirror or a prism for splitting an object image may be provided in the camera body. The movable mirror also may be arranged not inside the camera body but inside an adaptor.

Further, according to the first embodiment, the CCD image sensor 110 is illustrated as an imaging device. The imaging device, however, is not limited to the CCD image sensor 110, and may be, for example, a CMOS image sensor or an NMOS image sensor.

The camera system 1 may have a function (a sleep mode) to power off itself automatically when no operation is made on the camera system 1 by a user for a predetermined time. When the camera system 1 has such a function, the power-on in the steps S10 and S20 may include the power-on recovered from the automatic power-off state (the sleep mode). Also, the power-on in the steps S10 and S20 may include the power-on of the interchangeable lens 200 by starting to supply power from the camera body 100 to the interchangeable lens 200.

For plural IDs, the flash memory 142 may store information related to each of the plural IDs, such as gain G.

Although the present embodiment has been described in connection with specified embodiments thereof, many other modifications, corrections and applications are apparent to those skilled in the art. Therefore, the present embodiment is not limited by the disclosure provided herein but limited only to the scope of the appended claims.

Industrial Applicability

The aforementioned embodiments are applicable to an imaging apparatus such as a digital still camera or a digital video camera.

What is claimed is:

1. A camera body to which an interchangeable lens is mountable, comprising:
   an imaging unit operable to generate image data by capturing an object image;
   an acquisition unit operable to acquire optical data indicating an optical characteristic of the interchangeable lens from the interchangeable lens;
   a correction unit operable to correct the image data generated by the imaging unit based on the optical data acquired by the acquisition unit;
   a detection unit operable to detect a state of mounting/demounting the interchangeable lens to/from the camera body; and a display unit operable to display an image based on the image data;

wherein, after detecting that the interchangeable lens is completely mounted to the camera body, when the detection unit detects that the interchangeable lens is being demounted from the camera body, the display unit stops displaying the image based on the image data, and when the detection unit subsequently detects that the interchangeable lens is completely demounted from the camera body, the correction unit stops correcting the image data and the display unit displays the image based on the image data.

2. The camera body according to claim 1, wherein when the detection unit detects that the interchangeable lens is completely mounted to the camera body, the display unit displays the image based on the image data and the correction unit corrects the image data.

3. The camera body according to claim 2, wherein when the detection unit detects that the interchangeable lens is completely demounted from the camera body, the correction unit stops correcting the image data.

4. The camera body according to claim 1, wherein the correction unit corrects at least one of distortion, chromatic aberration, or shading of the image data generated by the imaging part.

5. The camera body according to claim 1, wherein the detection unit includes a mechanism operable to mechanically detect mounting/demounting of the interchangeable lens, and a terminal operable to electrically detect mounting/demounting of the interchangeable lens.

6. The camera body according to claim 1, wherein the detection unit detects mounting/demounting of the interchangeable lens in accordance with a predetermined specification.

7. A camera body to which an interchangeable lens is mountable, comprising:

an imaging unit operable to generate image data by capturing an object image;

an acquisition unit operable to acquire optical data indicating an optical characteristic of the interchangeable lens from the interchangeable lens;

a correction unit operable to correct the image data generated by the imaging unit based on the optical data acquired by the acquisition unit;

a detection unit operable to detect a state of mounting/demounting the interchangeable lens to/from the camera body; and a display unit operable to display an image based on the image data;

wherein when the detection unit detects that the interchangeable lens is completely demounted from the camera body, the display unit displays the image based on the image data, and when the detection unit subsequently detects that the interchangeable lens is being mounted to the camera body, the display unit stops displaying the image based on the image data.

8. The camera body according to claim 7, wherein when the detection unit detects that the interchangeable lens is completely demounted from the camera body, the correction unit stops correcting the image data.

9. The camera body according to claim 8, wherein, after detecting that the interchangeable lens is being mounted to the camera body, when the detection unit detects that the interchangeable lens is completely mounted to the camera body:

the correction unit corrects the image data, and the display unit stops displaying the image based on the image data before the correction unit completes correction of the image data, and displays the image based on the corrected image data after the correction unit completes correction of the image data.

10. The camera body according to claim 7, wherein the correction unit corrects at least one of distortion, chromatic aberration, or shading of the image data generated by the imaging part.

11. The camera body according to claim 7, wherein the detection unit includes a mechanism operable to mechanically detect mounting/demounting of the interchangeable lens, and a terminal operable to electrically detect mounting/demounting of the interchangeable lens.

12. The camera body according to claim 7, wherein the detection unit detects mounting/demounting of the interchangeable lens in accordance with a predetermined specification.

13. A camera body to which an interchangeable lens is mountable, comprising:

an imaging unit operable to generate image data by capturing an object image;

an acquisition unit operable to acquire optical data indicating an optical characteristic of the interchangeable lens from the interchangeable lens;

a correction unit operable to correct the image data generated by the imaging unit based on the optical data acquired by the acquisition unit;

a detection unit operable to detect a state of mounting/demounting the interchangeable lens to/from the camera body; and a display unit operable to display an image based on the image data;

wherein, after detecting that the interchangeable lens is completely mounted to the camera body, when the detection unit detects that the interchangeable lens is being demounted from the camera body, the display unit displays the image based on the image data, and when the detection unit subsequently detects that the interchangeable lens is completely demounted from the camera body, the correction unit stops correcting the image data and the display unit displays the image based on the image data.

14. A camera body to which an interchangeable lens is mountable, comprising:

an imaging unit operable to generate image data by capturing an object image;

an acquisition unit operable to acquire optical data indicating an optical characteristic of the interchangeable lens from the interchangeable lens;

a correction unit operable to correct the image data generated by the imaging unit based on the optical data acquired by the acquisition unit;

a detection unit operable to detect state of mounting/demounting the interchangeable lens to/from the camera body; and a display unit operable to display an image based on the image data;

wherein when the detection unit detects that the interchangeable lens is completely mounted to the camera body, the correction unit corrects the image data and the display unit displays the image based on the image data, and when the detection unit subsequently detects that the interchangeable lens is completely demounted from the camera body, the correction unit stops correcting the image data and the display unit displays the image based on the image data.

15. A camera system comprising:
an interchangeable lens including a storage unit storing the optical data indicating the optical characteristic of the interchangeable lens; and
the camera body according to claim 1.

16. A camera system comprising:
an interchangeable lens including a storage unit storing the optical data indicating the optical characteristic of the interchangeable lens; and
the camera body according to claim 7.

17. A camera system comprising:
an interchangeable lens including a storage unit storing the optical data indicating the optical characteristic of the interchangeable lens; and
the camera body according to claim 13.

18. A camera system comprising:
an interchangeable lens including a storage unit storing the optical data indicating the optical characteristic of the interchangeable lens; and
the camera body according to claim 14.

* * * * *